United States Patent
Min et al.

(10) Patent No.: US 12,222,416 B2
(45) Date of Patent: Feb. 11, 2025

(54) ELECTRONIC DEVICE FOR IDENTIFYING ATTRIBUTE OF OBJECT BY USING MILLIMETER WAVE AND CONTROL METHOD THEREFOR

(71) Applicant: Samsung Electronics Co., Ltd., Gyeonggi-do (KR)

(72) Inventors: Hyunkee Min, Gyeonggi-do (KR); Chiho Kim, Gyeonggi-do (KR); Junghun Lee, Gyeonggi-do (KR); Taehun Lim, Gyeonggi-do (KR); Junsu Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 17/668,528

(22) Filed: Feb. 10, 2022

(65) Prior Publication Data

US 2022/0163650 A1     May 26, 2022

Related U.S. Application Data

(63) Continuation of application No. PCT/KR2020/010765, filed on Aug. 13, 2020.

(30) Foreign Application Priority Data

Aug. 16, 2019     (KR) .................. 10-2019-0100386

(51) Int. Cl.
*G01S 13/08*     (2006.01)
*G01S 13/86*     (2006.01)
(Continued)

(52) U.S. Cl.
CPC ............ *G01S 13/08* (2013.01); *G01S 13/867* (2013.01); *G06V 40/172* (2022.01); *G08C 17/02* (2013.01); *H01Q 21/08* (2013.01)

(58) Field of Classification Search
None
See application file for complete search history.

(56) References Cited

U.S. PATENT DOCUMENTS 10,310,621 B1 *  6/2019  Lien .................... G06F 21/6245
10,664,059 B2 *  5/2020  Poupyrev ................ G01S 13/02
(Continued)

FOREIGN PATENT DOCUMENTS

JP           4110896 B2     7/2008
JP       2010-216980 A      9/2010
(Continued)

OTHER PUBLICATIONS

Korean Office Action date Nov. 4, 2024.

*Primary Examiner* — Marcus E Windrich
(74) *Attorney, Agent, or Firm* — Cha & Reiter, LLC

(57) ABSTRACT

According to various embodiments, an electronic device using a millimeter wave comprises: a first antenna array; a second antenna array; a communication circuit; and at least one processor, wherein the at least one processor may be configured to: control the communication circuit to output a first signal through the first antenna array; when a first reflected signal acquired from the first signal reflected by an object is received through the second antenna array, determine the range between the object and the electronic device on the basis of the first reflected signal; determine an output period of a second signal on the basis of the determined range; control the communication circuit to output the second signal through the first antenna array according to the determined output period; and when a second reflected signal acquired from the second signal reflected by the object is received through the second antenna array, identify an attribute of the object on the basis of the second reflected signal. Various other embodiments may be possible.

10 Claims, 23 Drawing Sheets

(51) Int. Cl.
*G06V 40/16* (2022.01)
*G08C 17/02* (2006.01)
*H01Q 21/08* (2006.01)

(56) References Cited

U.S. PATENT DOCUMENTS

| | | | |
|---|---|---|---|
| 11,132,915 B1* | 9/2021 | McIver | G06F 3/011 |
| 11,869,039 B1* | 1/2024 | Riding | G06V 40/172 |
| 2011/0181510 A1* | 7/2011 | Hakala | G06F 3/017 |
| | | | 345/158 |
| 2012/0092284 A1 | 4/2012 | Rofougaran et al. | |
| 2015/0091694 A1* | 4/2015 | Degtyarev | G08C 23/04 |
| | | | 340/5.51 |
| 2015/0207626 A1* | 7/2015 | Neftel | G16H 40/67 |
| | | | 713/168 |
| 2015/0372735 A1* | 12/2015 | Chang | H04B 7/0608 |
| | | | 375/267 |
| 2016/0345275 A1 | 11/2016 | Zhang et al. | |
| 2018/0001952 A1* | 1/2018 | Rajamani | B62J 45/41 |
| 2018/0196501 A1* | 7/2018 | Trotta | G06F 3/017 |
| 2018/0357474 A1* | 12/2018 | Horng | G06V 40/23 |
| 2019/0080066 A1 | 3/2019 | Van Os et al. | |
| 2019/0164400 A1* | 5/2019 | Harman | G08B 13/26 |
| 2019/0187265 A1* | 6/2019 | Barbello | G06F 18/22 |
| 2020/0019686 A1 | 1/2020 | Min et al. | |
| 2020/0204541 A1* | 6/2020 | Nair | H04L 63/0853 |
| 2020/0400811 A1* | 12/2020 | Gu | G01S 7/4808 |
| 2021/0088643 A1* | 3/2021 | Hayashi | G01S 13/88 |
| 2021/0127076 A1 | 4/2021 | Oh | |
| 2023/0288618 A1* | 9/2023 | Lev | H04N 23/56 |

FOREIGN PATENT DOCUMENTS

| | | |
|---|---|---|
| JP | 2019-26022 A | 2/2019 |
| KR | 10-2015-0141414 A | 12/2015 |
| KR | 10-2016-0085806 A | 7/2016 |
| KR | 10-2016-0097032 A | 8/2016 |
| KR | 10-2017-0040005 A | 4/2017 |
| KR | 10-2020-0006757 A | 1/2020 |
| KR | 10-2020-0095691 A | 8/2020 |

* cited by examiner

ELECTRONIC DEVICE FOR IDENTIFYING ATTRIBUTE OF OBJECT BY USING MILLIMETER WAVE AND CONTROL METHOD THEREFOR

CROSS-REFERENCE TO RELATED APPLICATION(S)

This application is a continuation of International Application No. PCT/KR2020/010765, filed on Aug. 13, 2020, which claims priority to Korean Patent Application No. 10-2019-0100386, filed on Aug. 16, 2019, in the Korean Intellectual Property Office, the disclosures of which are incorporated by reference herein in their entireties.

BACKGROUND

1. Technical Field

Various embodiments of the disclosure relate to an electronic device for identifying an attribute of an object using millimeter wave and a method for controlling the same.

2. Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

SUMMARY

An electronic device may recognize the surrounding environment using information obtained from various sensors. For example, the electronic device may recognize the surrounding environment by detecting the amount of light (e.g., infrared ray (IR)) reflected by an object positioned around thereto, using a proximity sensor or detecting the time taken for the light emitted from the electronic device to be reflected from the object thereto (e.g., ToF), using a time-of-flight (ToF) sensor.

A millimeter wave may include a signal using a broad bandwidth from a frequency band of 30 GHz to 300 GHz to several GHz. In general, a signal with a high frequency band (that is, a high frequency) has high transmissivity through an obstacle, high straightness and accuracy (in other words, time resolution or range resolution) and may thus be used as radar signal.

The electronic device may include separated areas for a processor of an application to process specific data requiring security. For example, the application processor may include a secured area for which access is restriction to other components of the electronic device or an external electronic device, when processing the specific data requiring security.

The electronic device may detect the presence of an object around or the distance to a nearby object using a proximity sensor or a ToF sensor. In general, since the proximity sensor or ToF sensor uses a light source, it may be covered with a light transmissive material or be exposed at the front top of the electronic device (e.g., a smartphone). If a non-light transmissive material is positioned on the path along which light is emitted from the proximity sensor or ToF sensor as in the case where a whole display is provided on the front surface of the electronic device, the accuracy of surrounding environment recognition function, such as detecting an object around the electronic device, may be lowered.

The electronic device may operate as a radar to recognize the surrounding environment. To recognize the surrounding environment, the electronic device may emit a signal, and detect the distance to an object positioned around, using the signal reflected by the object and received. Since the electronic device may receive more reflection signals as the signals emitted to recognize the surrounding environment have a shorter period or more outputs, the electronic device may obtain more information about the surrounding environment. However, if the signal output period decreases or the number of outputs increases, the power (or energy) consumption for signal transmission from the electronic device may increase. Thus, the amount of information obtained and the power (or energy) consumption may trade off each other.

The electronic device may identify the user's gesture or face using various sensors and perform a function corresponding to the gesture or an authentication function through the face. When the electronic device processes sensing data obtained to identify the user's gesture or face from various sensors, if access to the sensing data by an external electronic device is permitted, a security issue may arise.

According to various embodiments of the disclosure, an electronic device is disclosed capable of addressing the foregoing issues.

According to various embodiments, an electronic device using a millimeter wave may comprise a first antenna array, a second antenna array, a communication circuit, and at least one processor. The at least one processor may be configured to control the communication circuit to output a first signal through the first antenna array, if a first reflection signal of the first signal reflected by an object, is received through the second antenna array, determine a distance between the object and the electronic device based on the first reflection signal, determine an output period of a second signal based on the determined distance, control the communication circuit to output the second signal according to the determined output period, through the first antenna array, and if a second reflection signal of the second signal reflected by the object, is received through the second antenna array, identify an attribute of the object based on the second reflection signal.

According to various embodiments, a method for controlling an electronic device using a millimeter wave may comprise outputting a first signal, if a first reflection signal of the first signal reflected by an object, is received, determining a distance between the object and the electronic device based on the first reflection signal, determining an output period for outputting a second signal based on the determined distance, outputting the second signal according to the determined output period, and if a second reflection signal of the second signal reflected by the object, is received, identifying an attribute of the object based on the second reflection signal.

According to various embodiments, an electronic device using a millimeter wave may comprise a communication circuit configured to transmit or receive the millimeter wave, a first processor, and a second processor. The second processor may be configured to control the communication circuit to output a first signal, if a first reflection signal of the first signal reflected by an object, is received, determine whether the object is positioned within a first distance from the electronic device based on the first reflection signal, if the object is determined to be positioned within the first distance from the electronic device, and transmit a control signal to the first processor. The first processor may be configured to control the communication circuit to output a second signal according to an output period determined based on a distance of the object from the electronic device, in response to the received control signal and, if a second reflection signal of the second signal reflected by the object, is received, identify an attribute of the object based on the second reflection signal.

According to various embodiments, the electronic device may detect the distance to an object around, using a communication circuit capable of outputting and receiving millimeter waves, which are signals having a band of 30 GHz to 300 GHz.

According to various embodiments, the electronic device may vary the transmission period of the signal for identifying the attribute of an object positioned around, depending on the distance to the object, thus adjusting the amount obtained for the surrounding environment and the power (or energy) consumption for signal transmission.

According to various embodiments, the electronic device may separate the processing area of the processor for communication data obtained upon communication with an external electronic device, and the processing area of the processor for recognition/authentication data obtained upon identifying the attribute of a surrounding object, raising the security level of the electronic device.

Various effects achievable according to the disclosure are not limited by the foregoing effects.

DETAILED DESCRIPTION

Figure 1:
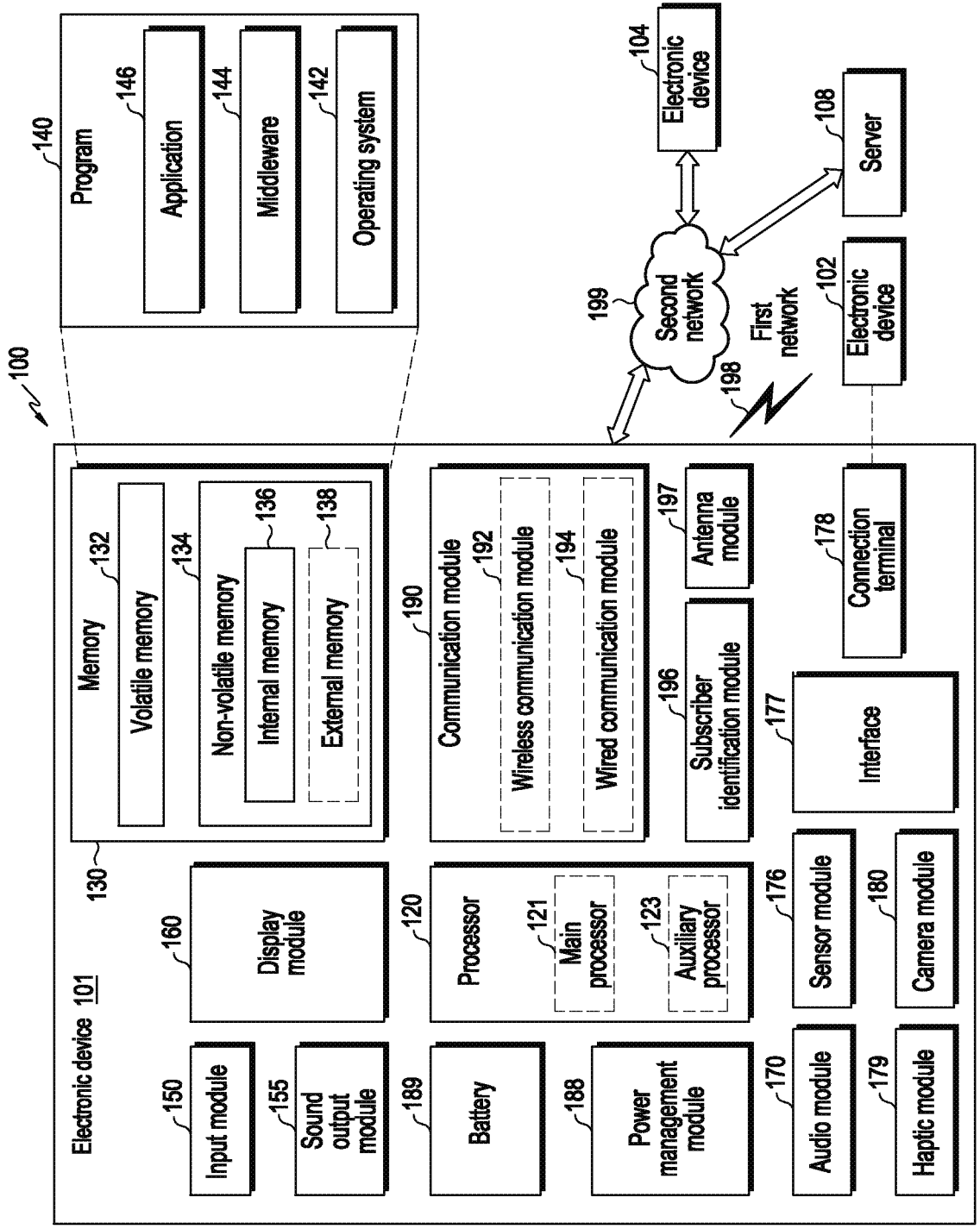
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
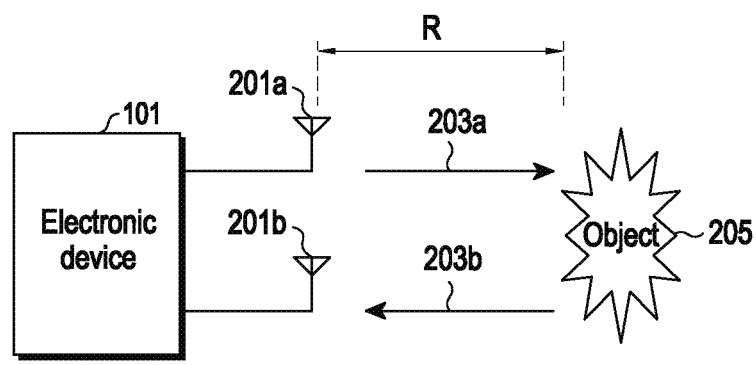
FIG. 2A is an example view for describing a distance estimation method using a millimeter wave of an electronic device according to various embodiments.

FIG. 2A is an example view for describing a distance estimation method using a millimeter wave of an electronic device 101 according to various embodiments.

According to various embodiments, the electronic device 101 may include a first antenna 201a and a second antenna 201b.

According to various embodiments, the electronic device 101 may transmit a signal 203a through the first antenna 201a. For example, the signal 203a may include a millimeter wave (e.g., a signal in a frequency band of 30 GHz to 300 GHz).

According to various embodiments, the electronic device 101 may receive the reflection signal 203b of transmitted signal reflected by the object 205, through the second antenna 201b. For example, the object 205 may include a human or a non-human object. For example, the reflection signal 203b may include a millimeter wave (e.g., a signal in a frequency band of 30 GHz to 300 GHz).

According to various embodiments, the electronic device 101 may detect the time from the transmission of the signal 203a to the reception of the reflection signal 203b. The time from the transmission of the signal 203a to the reception of the reflection signal 203b may be defined as a time of flight (ToF).

According to various embodiments, the electronic device 101 may identify the distance R between the electronic device 101 and the object 205 according to Equation 1.

$$R = \frac{\tau \times c}{2} \quad \text{[Equation 1]}$$

In Equation 1, R may mean the distance between the electronic device 101 and the object 205, $\tau$ may mean the time of flight (ToF), and c may mean the speed ($\approx 3.0*10^8$ m/s) of the electromagnetic wave. For example, if the time of flight is 1 ns, the distance between the electronic device 101 and the object 205 may be 15 cm.

As described above, the electronic device 101 may detect the time-of-flight (ToF) from the difference between the time of transmission of the signal 203a and the time of reception of the reflection signal 203b, determining the distance between the electronic device 101 and the object 205. However, the electronic device 101 may determine the distance between the electronic device 101 and the object 205 through other methods. For example, when the signal 203a is a millimeter wave, the electronic device 101 may identify the time of flight (ToF) by estimating the channel impulse response (CIR) from the reflection signal 203b, thereby determining the distance between the electronic device 101 and the object 205. A method for identifying the time of flight by estimating CIR is described below with reference to FIG. 2B.

Figure 2B:
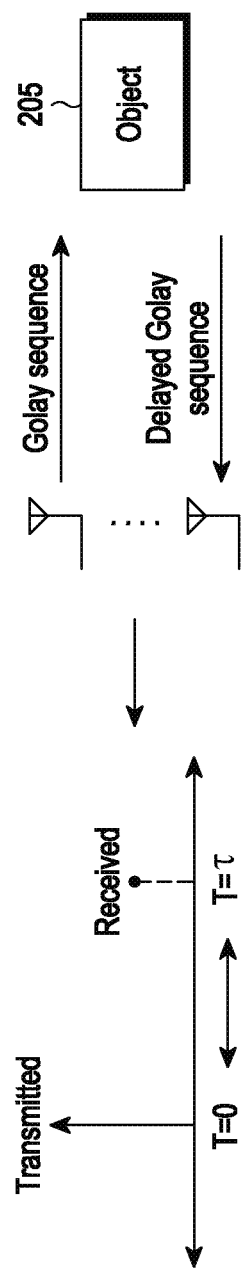
FIG. 2B is an example view for describing a distance estimation method using a millimeter wave of an electronic device according to various embodiments.

FIG. 2B is an example view for describing a distance estimation method using a millimeter wave of an electronic device (e.g., the electronic device 101 of FIG. 1) according to various embodiments.

According to various embodiments, the electronic device 101 may output a signal (e.g., the signal 203a of FIG. 2A) including a Golay sequence to the outside of the electronic device 101. The Golay sequence may include a pair of complementary sequences. The electronic device 101 may receive a reflection signal (e.g., the reflection signal 203b of FIG. 2A) reflected from the object 205. The reflection signal (e.g., reflection signal 203b of FIG. 2A) may be a signal including a delayed Golay sequence (e.g., a signal delayed by i relative to signal 203a). The electronic device 101 may calculate an autocorrelation value (e.g., a channel impulse response) of the Golay sequence for the received reflection signal (e.g., the reflection signal 203b of FIG. 2A). The electronic device 101 may calculate the autocorrelation value (e.g., channel impulse response (CIR)) of the Golay sequence for the received reflection signal (e.g., the reflection signal 203b of FIG. 2A) and compare the peak value of the autocorrelation value for the output signal (e.g., the signal 203a of FIG. 2A) at the time of output of signal and the peak value of the autocorrelation value for the reflection signal (e.g., the reflection signal 203b of FIG. 2A), thereby identifying the time of flight $\tau$. The electronic device 101 may identify the distance R between the electronic device 101 and the object 205 according to the identified time of flight and Equation 1 described above. The CIR may further include information about the amplitude and phase of the reflection signal (e.g., the reflection signal 203b of FIG. 2A). The information about the amplitude and phase of the reflection signal (e.g., the reflection signal 203b of FIG. 2A) included in the CIR may be used for a liveness detection operation, a gesture identification operation, or an authentication (e.g., face authentication) operation described below in the disclosure.

Figure 3:
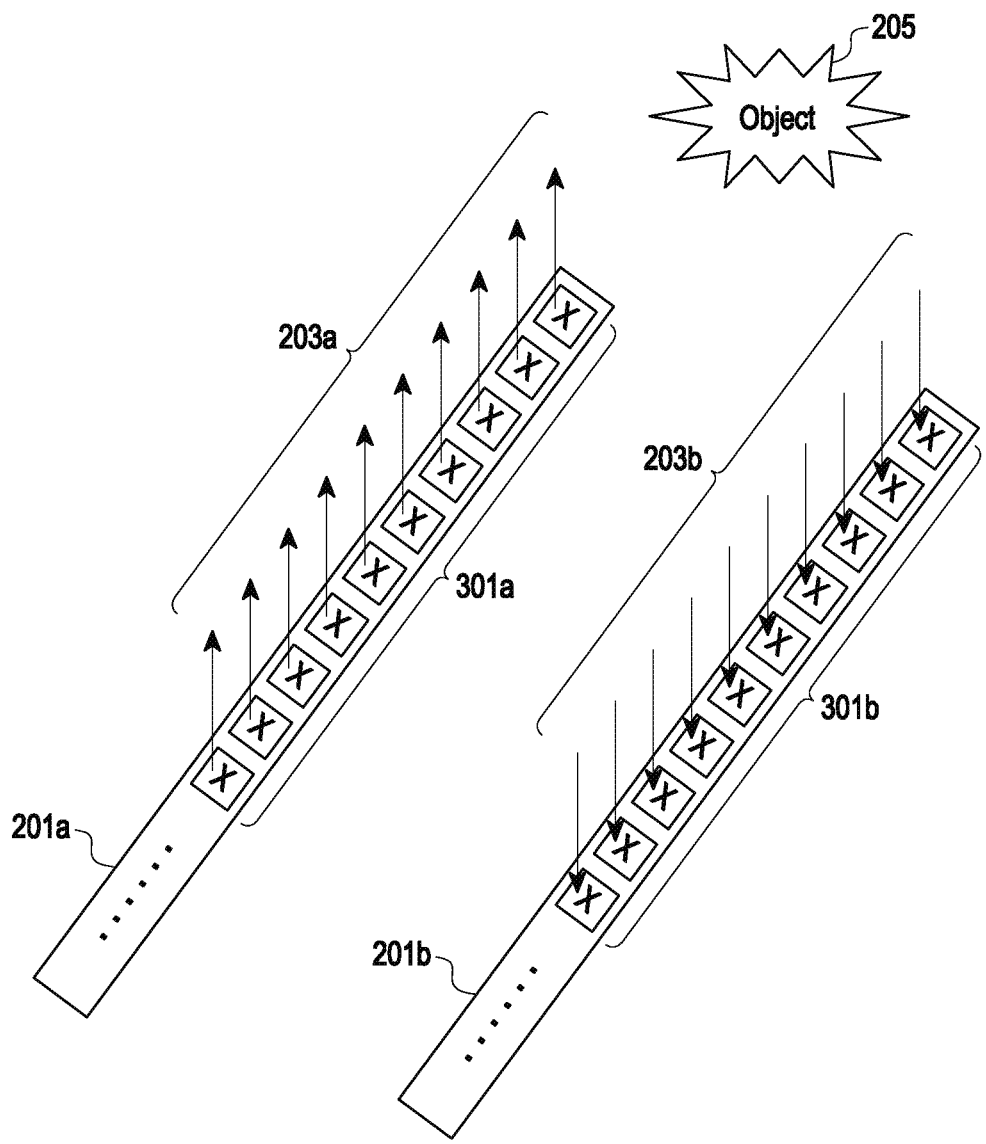
FIG. 3 is an example view for describing an antenna array of an electronic device according to various embodiments.

FIG. 3 is an example view for describing an antenna array of an electronic device 101 according to various embodiments.

According to various embodiments, a first antenna 201a and a second antenna 201b may include an array antenna including a plurality of antenna elements (e.g., first antenna elements 301a or second antenna elements 301b). Each of the antenna elements may include at least one of a patch antenna, a loop antenna, or a dipole antenna.

According to various embodiments, the first antenna 201a may form a directional signal (or radiation pattern) by transmitting signals 203a generated by the communication circuit (e.g., the communication module 190 of FIG. 1) through the first antenna elements 301a simultaneously or at certain time intervals. For example, the electronic device 101 may perform beamforming by shifting the phase of each of the signals input to the first antenna elements 301a and/or by adjusting the amplitude of each signal and may use a beamforming method of analog beamforming, digital beamforming, or hybrid beamforming, but the type thereof is not limited. The communication circuit (e.g., the communication module 190) may include a millimeter wave communication circuit capable of transmitting or receiving millimeter waves through the first and second antennas 201a and 201b. The communication circuit (e.g., the communication module 190) may perform communication for transmitting or receiving data with an external electronic device (e.g., the electronic device 102 or 104 or the server 108 of FIG. 1) using millimeter waves.

According to various embodiments, the second antenna 201b may receive the reflection signals 203b, which are the signals 203a transmitted from the first antenna 201a and reflected by the object 205, through the second antenna elements 301b.

According to various embodiments, the electronic device 101 may obtain a plurality of information through the first and second antennas 201a and 201b composed of a plurality of antenna elements. For example, when the first antenna elements 301a used for signal transmission/reception are M elements, and the second antenna elements 301b are N elements, M*N times as much information as when the signal 203a is transmitted and the reflection signal 203b is received through a single antenna may be obtained. For example, when the electronic device 101 operates in a proximity recognition mode, M and N may be 5. If the electronic device 101 repeatedly transmits the signals 203a L times, as much information as M*N*L times may be obtained. For example, when the electronic device 101 operates in the proximity recognition mode, L may be 8. When repeatedly transmitting the signals 203a, the electronic device 101 may transmit the signals 203a at different angles through the antenna element. In this case, the electronic device 101 may gather information for each of the angles at which the signals 203a are transmitted. The electronic device 101 may gather (or obtain) information for learning or determination for gesture recognition, pose recognition, or face authentication by adjusting the amount of information to be obtained, as described above.

According to various embodiments, the first antenna 201a and the second antenna 201b may not necessarily be implemented as antenna arrays physically separated from each other. For example, the above-described first and second antennas 201a and 201b may be implemented as a single integrated antenna array to transmit signals 203a through some of the antenna elements included in the antenna array and receive reflection signals 203b through others of the antenna elements.

Figure 4:
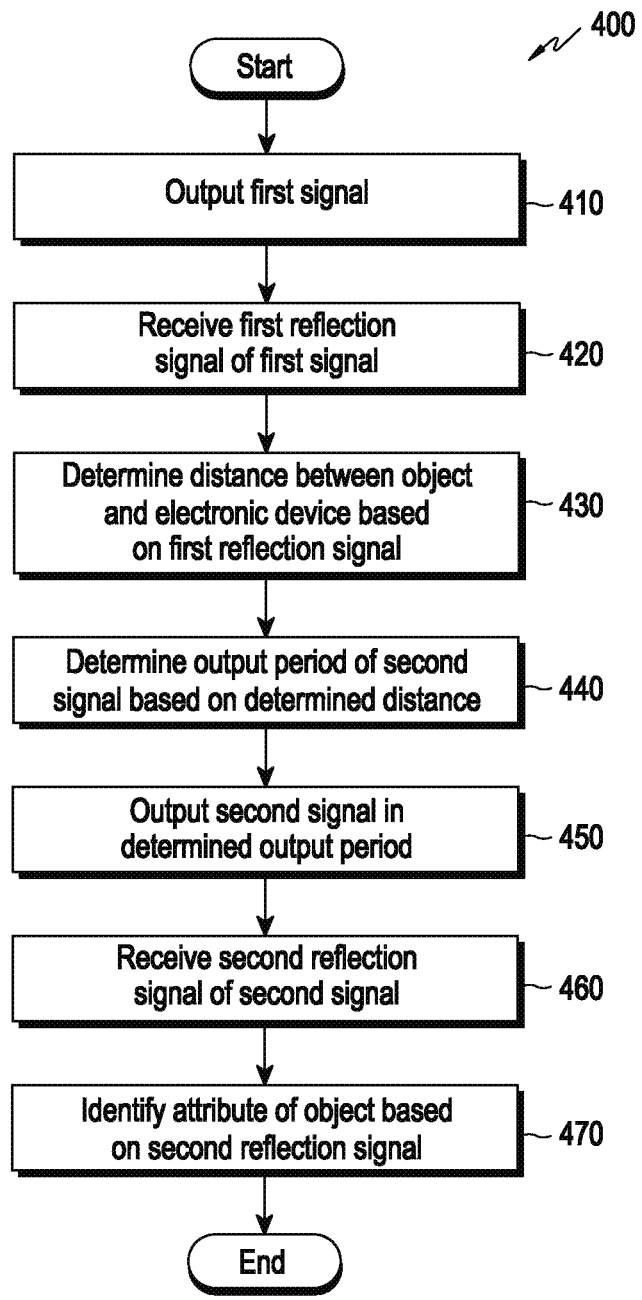
FIG. 4 is a flowchart illustrating an operation method of an electronic device according to various embodiments.

FIG. 4 is a flowchart 400 for describing an operation method of an electronic device (e.g., the electronic device 101 of FIG. 1) according to various embodiments.

According to various embodiments, in operation 410, the electronic device 101 may output a first signal (e.g., the signal 203a of FIG. 2A) in operation 410. The processor (e.g., the processor 120 of FIG. 1) may control the communication circuit (e.g., the communication module 190 of FIG. 1) to output a first signal (e.g., the signal 203a of FIG. 2A) through a first antenna (e.g., the first antenna 201a of FIG. 2A).

According to various embodiments, in operation 420, the electronic device 101 may receive a first reflection signal (e.g., the reflection signal 203b of FIG. 2A) of the first signal (e.g., the signal 203a of FIG. 2A). The communication circuit (e.g., the communication module 190) may receive the first reflection signal (e.g., the reflection signal 203b of FIG. 2A) of a reflection signal of the first signal (e.g., the signal 203a of FIG. 2A) by an object (e.g., the object 205 of FIG. 2A), through the second antenna (e.g., the second antenna 201b of FIG. 2A).

According to various embodiments, in operation 430, the electronic device 101 may determine the distance (e.g., R of FIG. 2A) between the electronic device 101 and the object (e.g., the object 205 of FIG. 2A) based on the first reflection signal (e.g., the reflection signal 203b of FIG. 2A). For example, the processor (e.g., the processor 120 of FIG. 1) may determine the distance R between the electronic device 101 and the object (e.g., the object 205 of FIG. 2A) through Equation 1 and the time of flight (ToF) as described above in connection with FIG. 2A or 2B.

For convenience of description, operations 410 to 430 described above to determine the distance between the electronic device 101 and the object (e.g., the object 205 of FIG. 2A) may be denoted as proximity recognition mode of the electronic device 101.

According to various embodiments, in operation 440, the electronic device 101 may determine the output period of a second signal (e.g., the signal 203a of FIG. 2A) based on the determined distance. The second signal (e.g., the signal 203a of FIG. 2A) may be described in the same manner as the signal 203a described above in connection with FIG. 2A.

According to various embodiments, in operation 450, the electronic device 101 may output the second signal (e.g., the signal 203a of FIG. 2A) in the determined output period. The processor 120 may control the communication circuit (e.g., the communication module 190) to output the second signal (e.g., the signal 203a of FIG. 2A) in the determined output period, through the first antenna (e.g., the first antenna 201a).

According to various embodiments, in operation 460, the electronic device 101 may receive a second reflection signal (e.g., the reflection signal 203b of FIG. 2A) of the second signal (e.g., the signal 203a of FIG. 2A). The communication circuit (e.g., the communication module 190) may receive the second reflection signal (e.g., the reflection signal 203b) which is the transmitted second signal (e.g., the signal 203a of FIG. 2A) reflected by the object (e.g., the object 205), through the second antenna (e.g., the second antenna 201b). The second reflection signal (e.g., the reflection signal 203b of FIG. 2A) may be described in the same manner as the reflection signal 203b described above in connection with FIG. 2A.

According to various embodiments, in operation 470, the electronic device 101 may identify the attributes of the object (e.g., 205 of FIG. 2A) based on the second reflection signal (e.g., the reflection signal 203b of FIG. 2A). For example, the attributes of the object (e.g., the object 205 of FIG. 2A) may include at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or a direction or speed of the object movement).

In the above-described operations, it has been described that the communication circuit transmits the first and second signals under the control of the processor. However, it may also be described that a separate sub processor (e.g., a modem) from the processor is included in the communication circuit, and the first and second signals are transmitted under the control of the sub processor.

Figure 5:
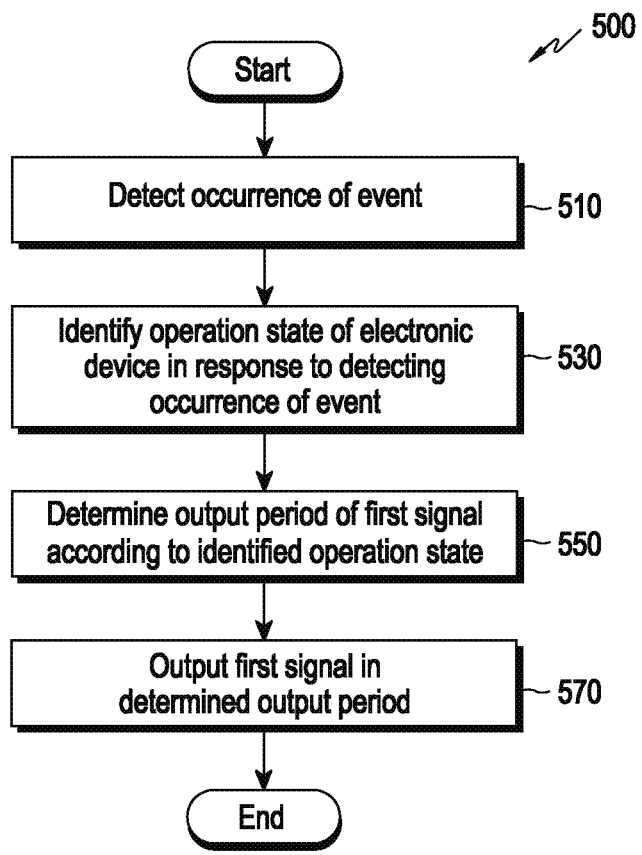
FIG. 5 is a flowchart illustrating an operation method of an electronic device according to various embodiments.

FIG. 5 is a flowchart 500 for describing an operation method of an electronic device (e.g., the electronic device 101 of FIG. 1) according to various embodiments.

According to various embodiments, in operation 510, the electronic device 101 may detect an occurrence of an event. The event may include an event for triggering the proximity recognition mode (e.g., the proximity recognition mode of FIG. 4) of the electronic device 101. An example of the event for triggering the proximity recognition mode is described in more detail with reference to FIGS. 6A to 6E. Operation 510 may be performed by a processor (e.g., the processor 120 of FIG. 1).

According to various embodiments, in operation 530, the electronic device 101 may identify the operation state of the electronic device 101 in response to detection of the occurrence of the event. For example, the operating state of the electronic device 101 may include at least one of an off state (e.g., a sleep state) of a display (e.g., the display device 160 of FIG. 1), an always-on-display (AOD) state of the display (e.g., the display device 160 of FIG. 1), an on state of the display (e.g., the display device 160 of FIG. 1), or an occurrence of a specific event (e.g., call reception). Operation 530 may be performed by the processor 120. Here, the AOD state may mean a low-power display mode in which only basic information, such as time, date, or battery status, is displayed while the display is in the sleep state or a state in which only at least a portion of the display is active.

According to various embodiments, in operation 550, the electronic device 101 may determine the output period of the first signal according to the identified operation state. The first signal may be described in the same manner as the signal 203a described with reference to FIG. 2A. For example, when the display (e.g., the display device 160 of FIG. 1) is in the off state, the processor 120 may determine the output period for outputting the first signal to be 100 ms (or 10 fps). As another example, when the display (e.g., the display device 160 of FIG. 1) is in the AOD state, the processor 120 may determine the output period for outputting the first signal to be 20 ms (or 50 fps). As another example, when the display (e.g., the display device 160 of FIG. 1) is in the on state or the call reception state, the processor 120 may determine the output period for outputting the first signal to be 10 ms (or 100 fps). As the above-described output period decreases, power consumption for outputting the first signal may increase. For example, when the output period of the first signal is 20 ms (or 50 fps), the power consumption for outputting the first signal may be 3 mW, and when the output period is 10 ms (or 100 fps), the power consumption for outputting the first signal may be 4 mW. The above-described output period for each operation state of the electronic device is an output period preset for each operation state based on current consumption and recognition delay and may be preset to a value different from the above-described value.

According to various embodiments, the electronic device 101 may output the first signal in the determined output period in operation 570. The processor 120 may control the communication circuit (e.g., the communication module 190 of FIG. 1) to output the first signal through the first antenna 201a.

Operations 530 to 550 described above may be omitted. More specifically, when the occurrence of an event is detected, the electronic device 101 may output the first signal in the preset output period (e.g., 20 ms) regardless of the operation state of the electronic device.

Figure 6A:
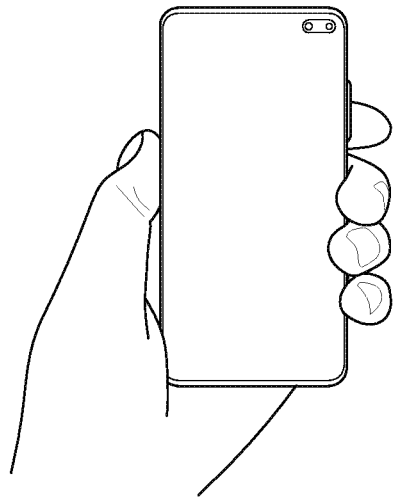
FIG. 6A is an example view illustrating a type of event occurring on an electronic device according to various embodiments.
Figure 6B:
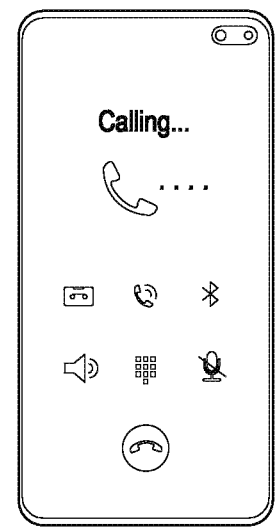
FIG. 6B is an example view illustrating a type of event occurring on an electronic device according to various embodiments.
Figure 6C:
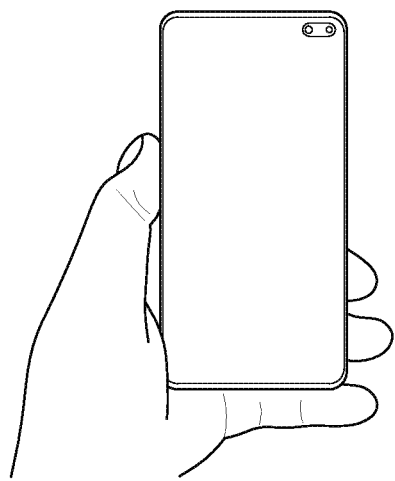
FIG. 6C is an example view illustrating a type of event occurring on an electronic device according to various embodiments.
Figure 6D:
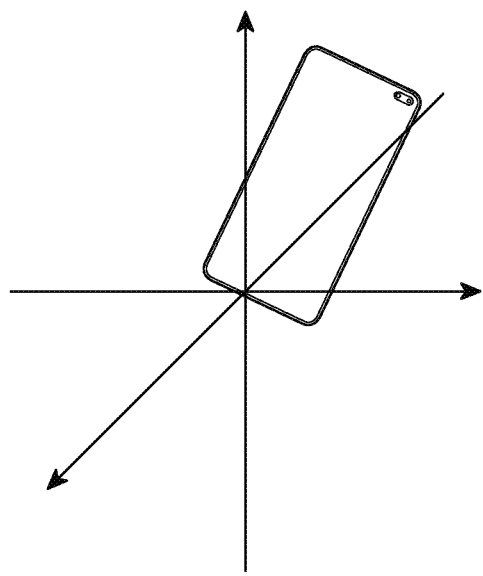
FIG. 6D is an example view illustrating a type of event occurring on an electronic device according to various embodiments.
Figure 6E:
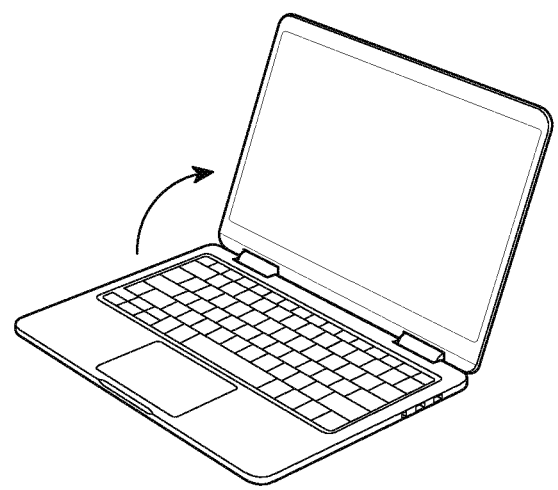
FIG. 6E is an example view illustrating a type of event occurring on an electronic device according to various embodiments.

FIG. 6A is an example view for describing a type of event occurring on an electronic device 101 according to various embodiments. FIG. 6B is an example view for describing a type of event occurring on an electronic device 101 according to various embodiments. FIG. 6C is an example view for describing a type of event occurring on an electronic device 101 according to various embodiments. FIG. 6D is an example view for describing a type of event occurring on an electronic device 101 according to various embodiments. FIG. 6E is an example view for describing a type of event occurring on an electronic device 101 according to various embodiments.

FIG. 6A illustrates a turn-on event of the electronic device 101. The turn-on event may include an event in which the display switches from the off state (or always-on-display (AOD) state) to the on state according to an input of pressing a physical button (e.g., power button) of the electronic device 101 or reception of a specific notification (e.g., reception of a message or call) from the outside. The off state may mean a state in which the display is inactive (e.g., a sleep state). The on state may mean a state in which the display is activated and a screen is displayed on the display.

FIG. 6B illustrates a call reception event of the electronic device 101. The call reception event may include an event according to reception of a specific notification (e.g., reception of a message or call) from the outside.

FIG. 6C illustrates a grip event of the electronic device 101. The grip event may include an event that occurs when a motion of the user (e.g., hand) gripping the electronic device 101 is detected by a grip sensor (e.g., the sensor module 176).

FIG. 6D illustrates a tilt event of the electronic device 101. The tilt event may mean an event that occurs as a change in the angle of the front part (e.g., display) of the electronic device 101 by a predetermined angle or more is detected by a gyro sensor or acceleration sensor included in the sensor module (e.g., the sensor module 176) of the electronic device 101.

FIG. 6E illustrates an open event of the electronic device 101. The open event may include an event that occurs as the upper housing (or body) of the electronic device 101 facing in a direction of a specific angle is detected by the gyro sensor or acceleration sensor or a spacing between the upper housing and the lower housing of the electronic device 101 by a predetermined distance or more is detected by the proximity sensor, or a predetermined amount of or more light incident on the upper housing (e.g., the display included in the upper housing) of the electronic device 101 is detected by the infrared (IR) sensor. According to various embodiments, the electronic device 101 may be a foldable device having a hinge structure (e.g., a device in which the upper/lower housings (e.g., display) abutting the hinge portion may be folded on the hinge portion). In this case, the electronic device 101 may detect the angle between the upper housing and the lower housing using the angle sensor included in the sensor module (e.g., the sensor module 176) and, if the detected angle is a predetermined angle (e.g., 45 degrees) or more, detect the open event. The electronic device 101 may detect whether the upper housing and the lower housing approach each other by a Hall sensor included in the sensor module (e.g., the sensor module 176) and, if the distance between the upper housing and the lower housing is within a predetermined distance, detect the open event.

Operation 510 of FIG. 5 may be performed based on events occurring according to sensing data using other various sensors not described in FIGS. 6C to 6E.

Figure 7:
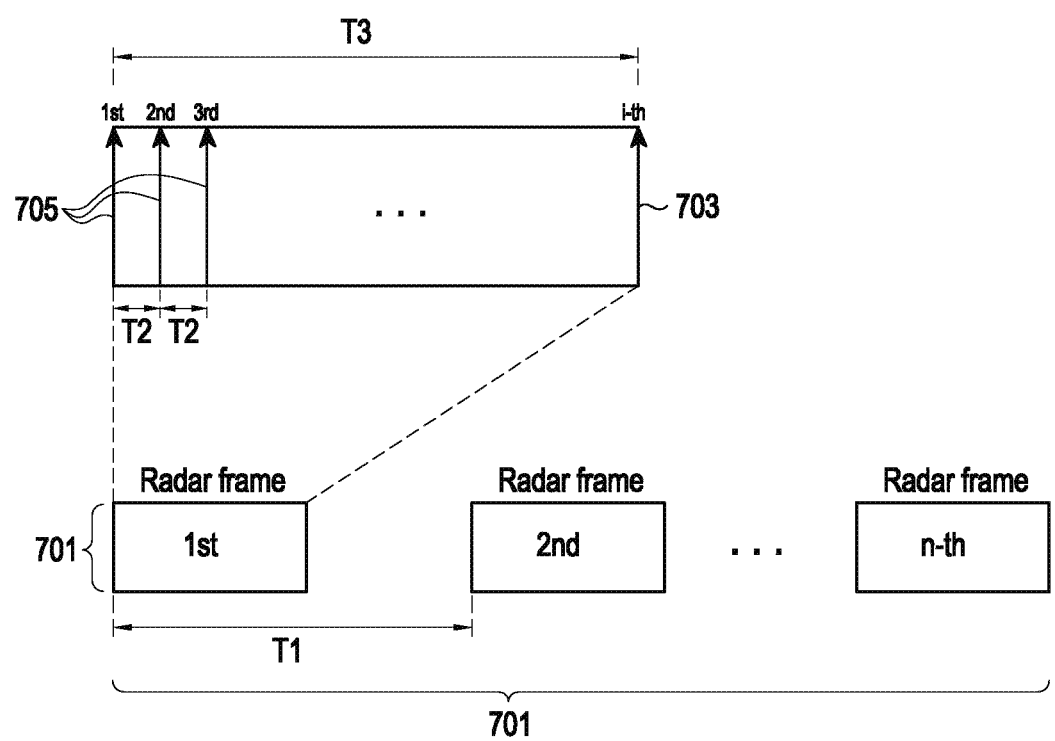
FIG. 7 is an example view illustrating a millimeter wave according to various embodiments.

FIG. 7 is an example view illustrating a millimeter wave according to various embodiments.

FIG. 7 illustrates n millimeter waves 701 in units of radar frames.

According to various embodiments, the radar frames may be repeatedly transmitted with a predetermined period T1. Here, T1 may be defined as a frame period (or an output period).

According to various embodiments, the radar frame 703 may be defined as a set of a plurality of (i) signals 705 that are repeatedly transmitted with a predetermined period T2. Here, T2 may be defined as a signal period, and i may be defined as the number of repetitions. For example, when the electronic device 101 operates in the proximity recognition mode, i may be 8.

According to various embodiments, each radar frame 703 may include signals repeatedly transmitted for a predetermined time T3. Here, T3 may be defined as duration.

According to various embodiments, the determined (or changed) output period of the signal (e.g., the first signal or the second signal) mentioned in the disclosure may mean the frame period T1 of FIG. 7.

Figure 8A:
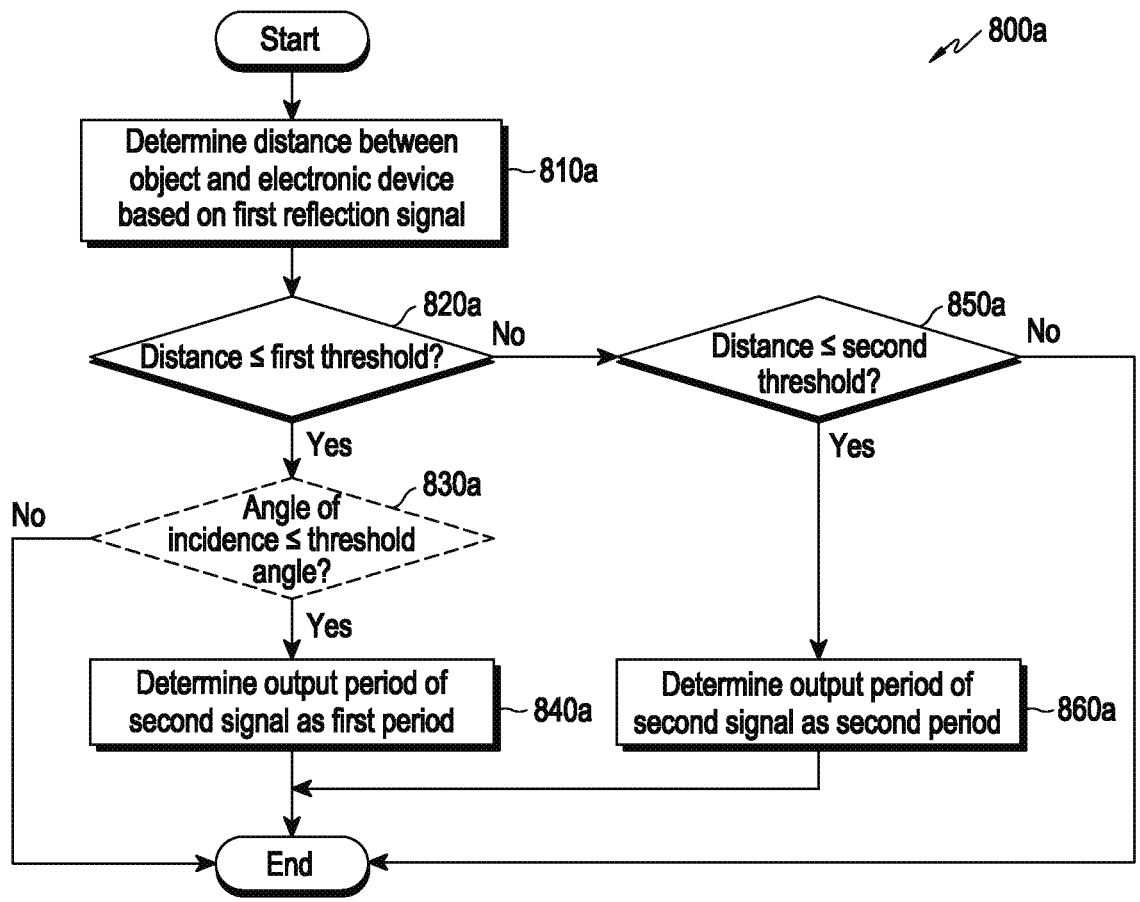
FIG. 8A is a flowchart illustrating an operation method of an electronic device according to various embodiments.

FIG. 8A is a flowchart 800a for describing an operation method of an electronic device (e.g., the electronic device 101 of FIG. 1) according to various embodiments.

According to various embodiments, in operation 810a, the electronic device 101 may determine the distance between the electronic device 101 and an object (e.g., the object 205 of FIG. 2A) based on a first reflection signal (e.g., the reflection signal 203b of FIG. 2A). Operation 810a may be performed by identifying the time-of-flight (ToF) described with reference to FIG. 2A or 2B. The first reflection signal may include a transmitted millimeter wave (e.g., the signal 203a of FIG. 2A) reflected by the object 205 and received.

According to various embodiments, in operation 820a, the electronic device 101 may determine whether the determined distance is equal to or less than a first threshold. For example, the first threshold may be set to 20 cm. Alternatively, the electronic device 101 may determine whether the determined distance is included in a first range (e.g., larger than 10 cm and less than or equal to 20 cm).

According to various embodiments, when the determined distance is equal to or less than the first threshold, in operation 830a, the electronic device 101 may determine whether the angle of incidence of the first reflection signal is equal to or less than a threshold angle (e.g., 45 degrees). The angle of incidence of the first reflection signal may mean the maximum angle among angles of incidence detected with respect to a front part (e.g., a display or a front camera) of the electronic device 101. Here, the angle of incidence of the first reflection signal may be determined based on a difference between phases and/or between the times of reception of the reflection signals received by the antenna elements 301b of the second antenna (e.g., the second antenna 201b of FIG. 2A). When it is determined in operation 830a that the angle of incidence exceeds the threshold angle (e.g., 45 degrees), the electronic device 101 may end the operations of FIG. 8A.

According to various embodiments, when the angle of incidence is equal to or less than the threshold angle, in operation 840a, the electronic device 101 may determine the output period of the second signal as a first period. For example, the first period may be set to 10 ms. After operation 840a, the electronic device 101 may operate in a gesture recognition mode, which is described below.

According to various embodiments, when the determined distance exceeds the first threshold, in operation 850a, the electronic device 101 may determine whether the determined distance is equal to or less than a second threshold. For example, the second threshold may be set to 50 cm. When it is determined in operation 850a that the determined distance exceeds the second threshold (e.g., 50 cm), the electronic device 101 may end the operations of FIG. 8A.

According to various embodiments, when the determined distance is equal to or less than the second threshold (e.g., larger than the first threshold and less than or equal to the second threshold), in operation 860a, the electronic device 101 may determine the output period of the second signal as a second period. For example, the second period may be shorter than the first period of operation 840a, and it may be set to 2 ms or 5 ms. According to various embodiments, when the determined angle of incidence is larger than the threshold angle or the determined distance exceeds the second threshold, the electronic device 101 may repeat one or more operations among operations 410 to 430 of FIG. 4 and, while repeating one or more operations among operations 410 to 430, output a visual message (e.g., text or image) or sound (e.g., "Bring the device closer to the screen") instructing the user to bring the electronic device 101 closer through an output device, such as a display (e.g., the display device 160 of FIG. 1) or a speaker (e.g., the sound output device 155 of FIG. 1). The electronic device 101 101 may operate in an authentication mode which is described below.

According to various embodiments, the above-described operation 830*a* may be omitted. When the determined distance is equal to or less than the first threshold, the electronic device 101 may determine the output period of the second signal as the first period without determining whether the angle of incidence of the second reflection signal is equal to or less than the threshold angle.

According to various embodiments, in at least one of operation 840*a* and operation 860*a*, the electronic device 101 may further determine at least one of the duration time and the number of repetitions of the second signal. For example, referring to FIGS. 3 and 7 together, in operation 840*a*, the electronic device 101 may determine the number of transmissions (e.g., i=64) in each radar frame, the number (n) of transmissions of the radar frame, or the number (e.g., every 5) of antenna elements used for signal transmission and reception among the antenna elements included in the first and second antennas 201*a* and 201*b*. For example, in at least one of operation 840*a* or operation 860*a*, the electronic device 101 may determine the number of transmissions (e.g., i=64) in each radar frame, the number (n) of transmissions of the radar frame, or the number (e.g., every 10) of antenna elements used for signal transmission and reception among the antenna elements included in the first and second antennas 201*a* and 201*b*.

Figure 8B:
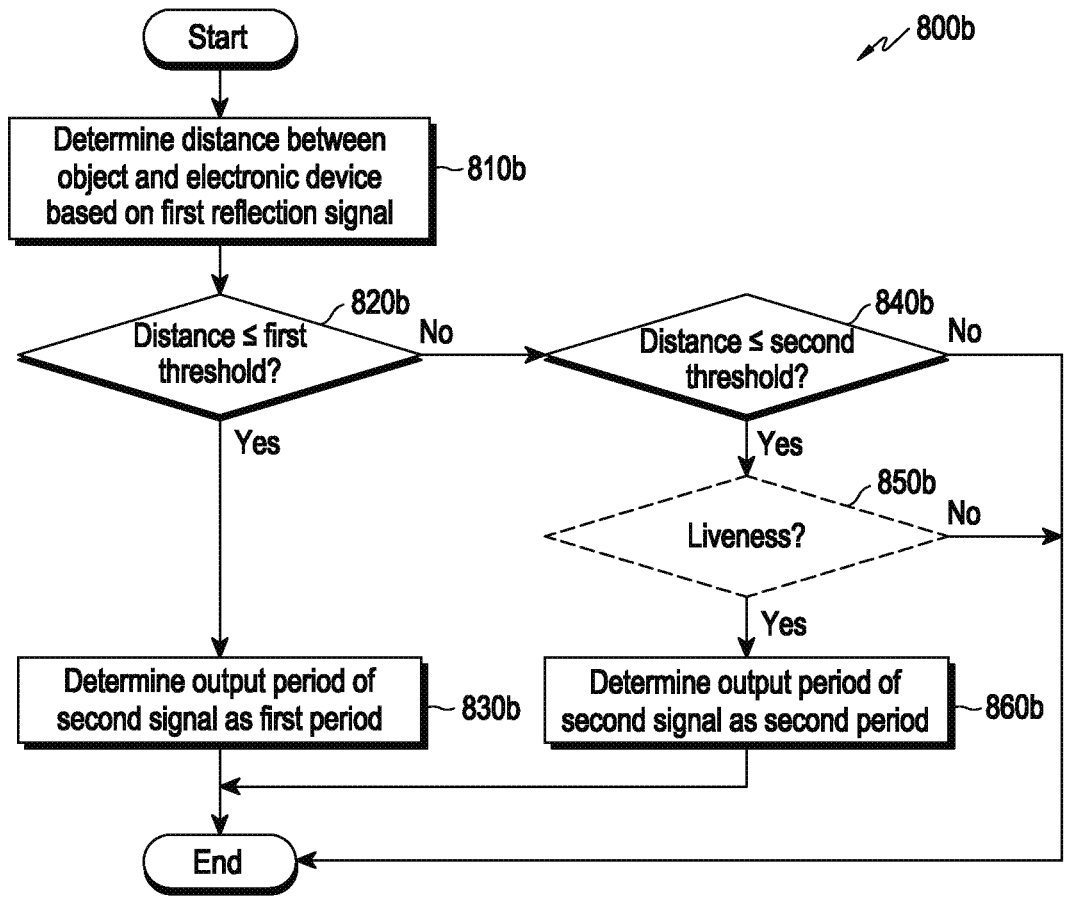
FIG. 8B is a flowchart illustrating an operation method of an electronic device according to various embodiments.

FIG. 8B is a flowchart 800*b* for describing an operation method of an electronic device (e.g., the electronic device 101 of FIG. 1) according to various embodiments.

Referring to FIG. 8B, operations 810*b*, 820*b*, 830*b*, 840*b*, and 860*b* may be described in the same manner as those of operations 810*a*, 820*a*, 840*a*, 850*a*, and 860*a*, respectively, of FIG. 8A.

The following description focuses primarily on the operation of detecting the liveness of an object in operation 850*b*.

According to various embodiments, the electronic device 101 may detect the liveness of an object (e.g., the object 205 of FIG. 2A) in operation 850*b*. The operation of detecting liveness may include an operation for detecting whether the object 205 on which authentication is performed is the face of a user of the electronic device 101 or a person (e.g., human skin) rather than an object.

According to various embodiments, the electronic device 101 may include a memory (e.g., the memory 130 of FIG. 1).

According to various embodiments, the memory 130 may store learned reference data for liveness detection. The electronic device 101 may transmit (or emit) at least one signal (e.g., a millimeter wave) to an object (e.g., a person or a non-human object) using the communication circuit (e.g., the communication module 190 of FIG. 1) and receive at least one reflection signal which is the transmitted signal reflected by the object. The electronic device 101 may extract the CIR from the at least one received reflection signal and gather data, such as real value, imaginary value, phase, or amplitude, for specific tabs having valid information in the CIR. The electronic device 101 may gather data for a plurality of objects by repeating the above-described signal transmission operation to the CIR extraction operation on the plurality of objects. The above-described CIR may have different patterns (e.g., patterns in which the attenuation rates of the data included in the CIR differ from each other) depending on the materials of the object (e.g., skin or the surface of the object). The electronic device 101 may gather the above-described data including the person (e.g., the user of the electronic device 101) on which authentication is performed or, without including the target on which authentication is performed, gather the above-described data. The electronic device 101 may perform training using a trained model (e.g., a rule-based model or an artificial intelligence model trained according to at least one of machine learning, neural network or deep learning algorithm) to generate liveness templates (in other words, liveness reference data) from the gathered data and store the generated liveness templates in the memory 130. The operations described in these paragraphs may be performed by an external electronic device (e.g., the electronic device 102 or 104 of FIG. 1) or a server (e.g., the server 108 of FIG. 1), as well as the electronic device 101. The generated liveness templates described in these paragraphs may be stored in a memory of an external electronic device or a memory of a server, as well as the memory 130.

According to various embodiments, in operation 810*b*, the electronic device 101 may extract the CIR corresponding to the first reflection signal and obtain data, such as real value, imaginary value, phase, or amplitude, for specific tabs having valid information in the extracted CIR.

According to various embodiments, the electronic device 101 may compare the obtained data with the liveness templates stored in the memory 130 to determine whether the object on which authentication is performed is the face of the user of the electronic device 101 or a person (e.g., human skin), not an object.

According to various embodiments, when it is determined that the object on which authentication is performed is a human face or a person (e.g., human skin), not an object, the electronic device 101 may perform operation 840*b*.

According to various embodiments, the above-described operation 830*b* may be omitted. For example, when the determined distance is equal to or less than the second threshold, the electronic device 101 may determine the output period of the second signal as the second period without performing liveness detection.

According to various embodiments, the above-described operation 850*b* may be performed before operation 820*b* or before/after operation 840*b*.

Figure 9:
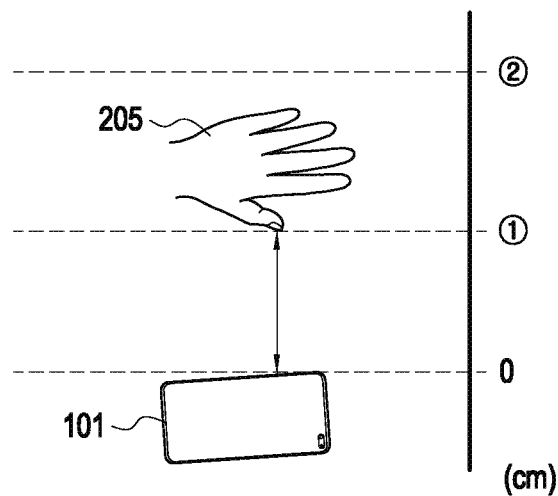
FIG. 9 is an example view illustrating an operation method of an electronic device according to various embodiments.

FIG. 9 is an example view illustrating an operation method of an electronic device 101 according to various embodiments.

According to various embodiments, the electronic device 101 may transmit a first signal (e.g., a millimeter wave) to an object 205. The electronic device 101 may receive a first reflection signal reflected by the object 205. When the electronic device 101 determines that the object 205 is positioned at a distance of less than or equal to a first threshold (e.g., 20 cm or less) (or a first range (larger than ① and less than or equal to ②) (e.g., larger than 10 cm and less than or equal to 20 cm)), the electronic device 101 may determine the output period of the second signal as a first period (e.g., 10 ms).

According to various embodiments, the electronic device 101 may output the second signal in the first period and may identify an attribute of the object 205 based on the second reflection signal of the second signal. For example, the attributes of the object may include at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or the direction or speed the object moves).

According to various embodiments, the electronic device 101 may identify a gesture according to a stop or movement of the object 205 based on the identified attribute of the object 205. For convenience of description, a series of operations in which the electronic device 101 identifies a gesture may be referred to as a gesture recognition mode of the electronic device.

According to various embodiments, the electronic device 101 may include a memory (e.g., the memory 130 of FIG. 1). The memory 130 may store reference data learned for gesture identification. The electronic device 101 may transmit (or emit) at least one signal (e.g., a millimeter wave) to an object (e.g., hand or finger) using the communication circuit (e.g., the communication module 190 of FIG. 1) and receive at least one reflection signal of the transmitted signal reflected by the object. The electronic device 101 may extract the CIR from the at least one received reflection signal and gather data, such as real value, imaginary value, phase, or amplitude, for specific tabs having valid information in the CIR. The electronic device 101 may gather data for a plurality of objects by repeating the above-described signal transmission operation to the CIR extraction operation on the plurality of objects. The above-described CIR may have a different pattern according to the type of gesture of the object. The electronic device 101 may gather data for a Doppler frequency from the CIR. The electronic device 101 may identify whether a specific gesture is a gesture approaching or moving away from the electronic device 101 according to whether the Doppler frequency value is positive or negative. The electronic device 101 may perform training by applying the above-described data to a trained model (e.g., a rule-based model or an artificial intelligence model trained according to at least one of machine learning, a neural network, or a deep learning algorithm). The electronic device 101 may generate gesture templates (in other words, gesture reference data) from the gathered data based on the training and may store the generated gesture templates in the memory 130. The operations described in these paragraphs may be performed by an external electronic device (e.g., the electronic device 102 or 104 of FIG. 1) or a server (e.g., the server 108 of FIG. 1), as well as the electronic device 101. The generated gesture templates described in these paragraphs may be stored in a memory of an external electronic device or a memory of a server, as well as the memory 130.

According to various embodiments, the electronic device 101 may obtain, from the second reflection signal, at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or the direction or speed the object moves), as the attributes of the object. The electronic device 101 may obtain data for the movement of the object 205 by repeatedly transmitting the second reflection signal within a designated time.

According to various embodiments, the electronic device 101 may identify the gesture of the object by comparing the obtained data with the gesture templates stored in the memory 130. The gesture may include at least one of a gesture of keeping a hand or finger on the display (e.g., the display device 160 of FIG. 1) for a specific time, a gesture detected in a specific area or more, a gesture maintained at a specific angle, a gesture of movement in a specific direction, a gesture of movement at a specific speed or more, or a gesture using a specific number of (or more) fingers.

Figure 10A:
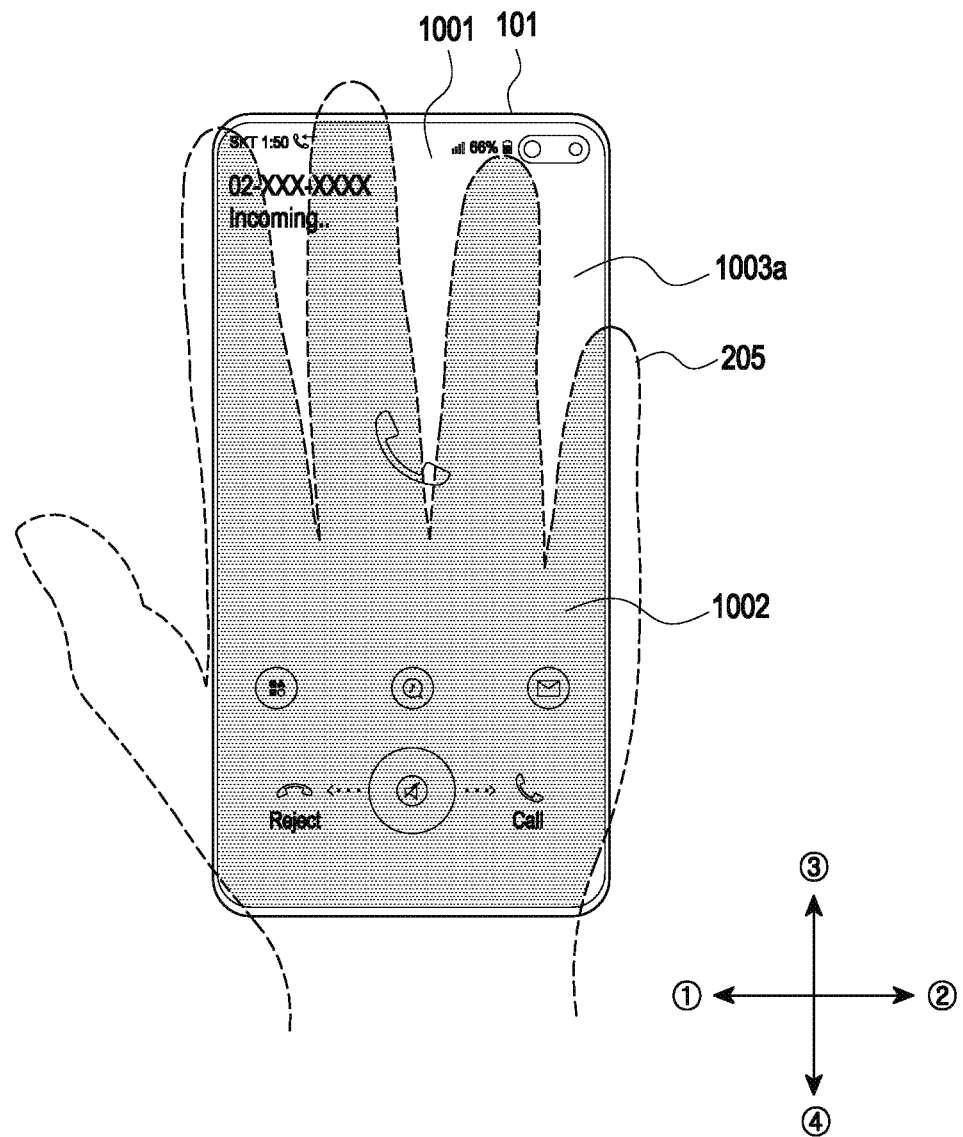
FIG. 10A is an example view illustrating a gesture identified by an electronic device according to various embodiments.
Figure 10B:
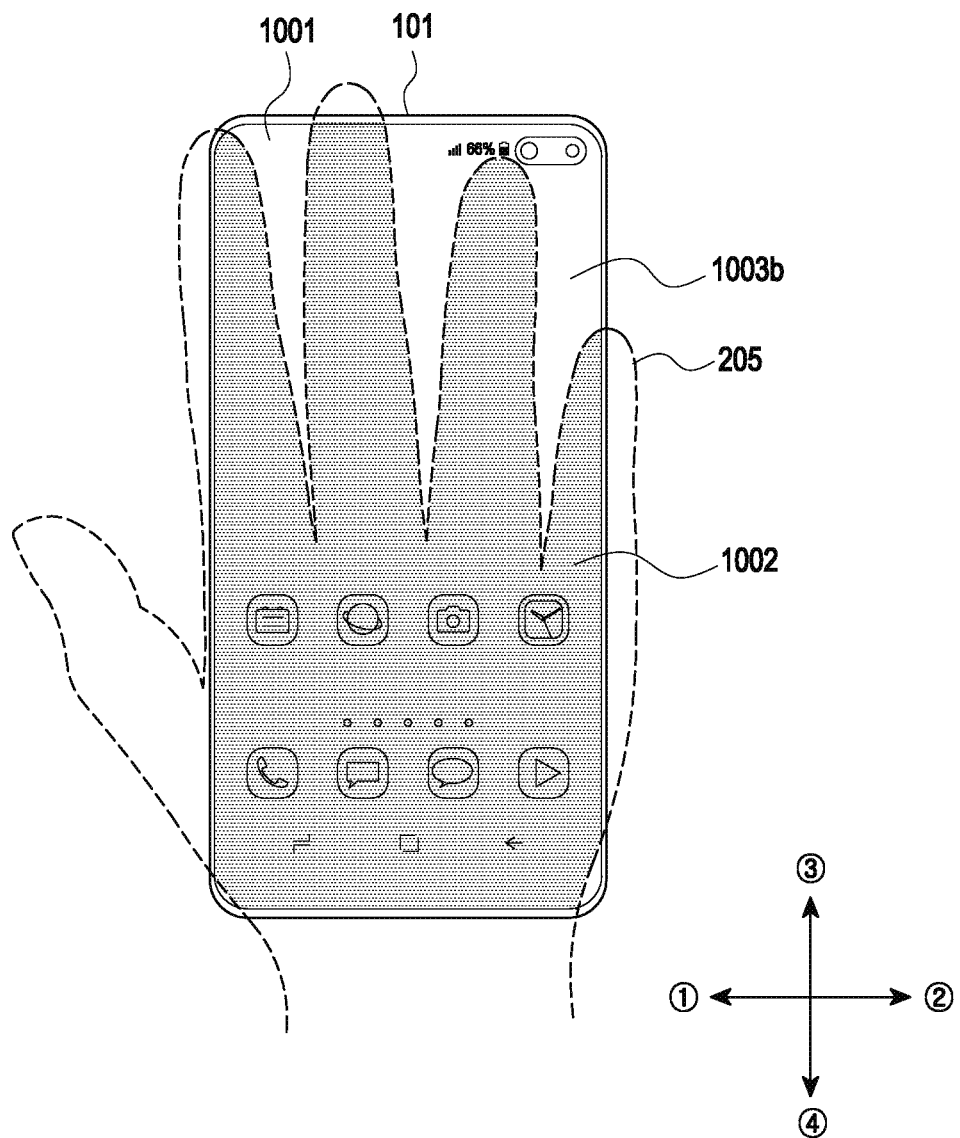
FIG. 10B is an example view illustrating a gesture identified by an electronic device according to various embodiments.
Figure 10C:
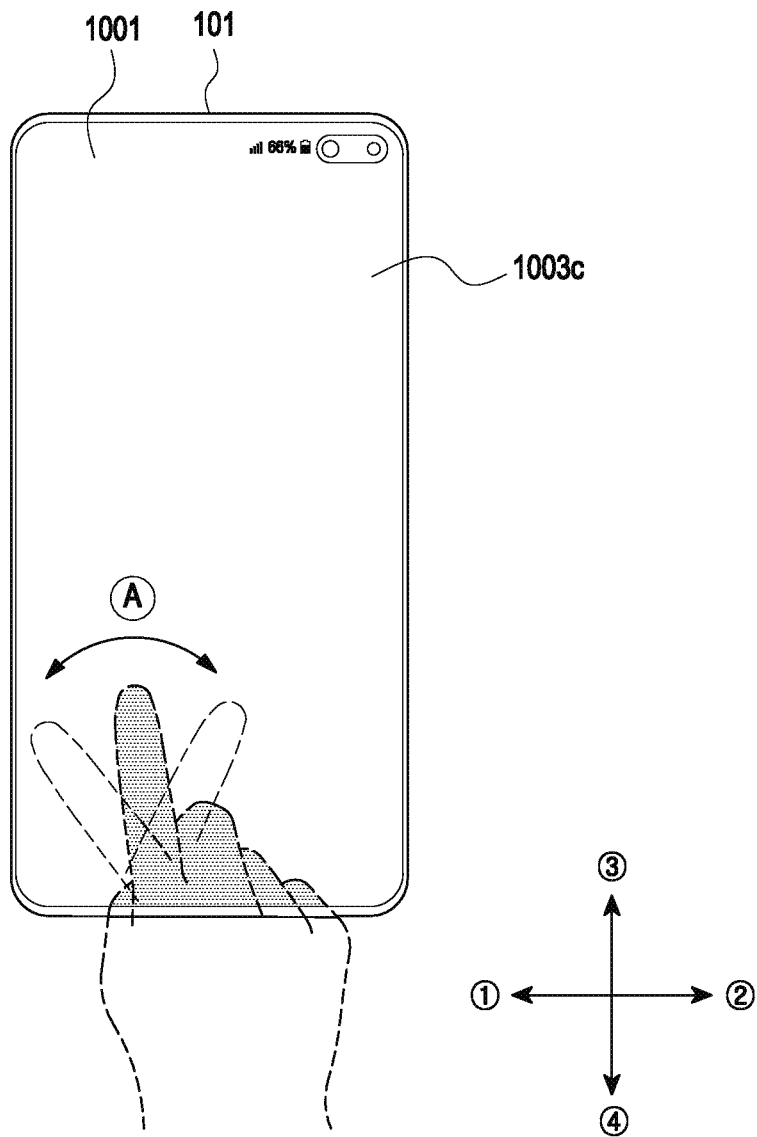
FIG. 10C is an example view illustrating a gesture identified by an electronic device according to various embodiments.

FIG. 10A is an example view illustrating a gesture identified by an electronic device 101 according to various embodiments. FIG. 10B is an example view illustrating a gesture identified by an electronic device 101 according to various embodiments. FIG. 10C is an example view illustrating a gesture identified by an electronic device 101 according to various embodiments.

FIG. 10A illustrate an example in which a call is received from an external electronic device (e.g., the electronic device 102 or 104 or the server 108 of FIG. 1).

According to various embodiments, when a call is being received, the electronic device 101 may display a screen 1003a indicating that the call is being received, on the display 1001 (e.g., the display device 160 of FIG. 1).

According to various embodiments, the electronic device 101 may transmit a first signal (e.g., a millimeter wave) to an object 205. The electronic device 101 may receive a first reflection signal reflected by the object 205. When the electronic device 101 determines that the object 205 is positioned at a distance of less than or equal to a first threshold (e.g., 20 cm or less) (or a first range (larger than ① and less than or equal to ②) (e.g., larger than 10 cm and less than or equal to 20 cm)), the electronic device 101 may determine the output period as a first period (e.g., 10 ms) and output the second signal.

According to various embodiments, the electronic device 101 may transmit the second signal (e.g., a millimeter wave), thereby identifying an attribute of the object 205. For example, the attributes of the object 205 may include at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display 1001), the shape of the object, or the movement of the object (e.g., whether the object moves, or the direction or speed the object moves).

According to various embodiments, the electronic device 101 may identify the gesture of the object 205 based on the attribute of the object 205.

For example, according to various embodiments, the identified gesture may include a gesture of moving in a specific direction (e.g., in a direction ① to ④ or a diagonal direction), a gesture of shaking in a specific direction (e.g., a gesture of shaking in the directions ① and ②), a gesture of stopping over a predetermined area (e.g., 80% of the area of the display 1001) or more of the display 1001, a gesture of stopping on the display 1001 for a predetermined time (e.g., four seconds), or various combined gestures of two or more of the aforementioned gestures or may include other various gestures. Although a hand is illustrated as the object 205 in FIG. 10A, a gesture using a finger or various input means (e.g., an electronic pen) may also be included.

According to various embodiments, the electronic device 101 may perform a function corresponding to the identified gesture.

For example, according to various embodiments, when the identified gesture is a gesture of moving the object 205 in a specific direction (e.g., in a direction from ① to ④, or in a diagonal direction), the electronic device 101 may perform the function of accepting or rejecting the incoming call. In this case, the electronic device 101 may perform the function of accepting or rejecting the call only when the moving speed of the gesture is a set value or more.

For example, according to various embodiments, when the identified gesture is a gesture of stopping over a predetermined area (e.g., 80% of the area of the display 1001) or more of the display 1001, the electronic device 101 101 may perform the function of rejecting the incoming call.

FIG. 10B illustrates a state 1003b in which a screen is displayed on the display 1001 of the electronic device 101 (in other words, a state in which the display 1001 is in the on state). What has been described in other paragraphs is briefly described or omitted.

According to various embodiments, when the identified gesture is a gesture of stopping over a predetermined area (e.g., 80% of the area of the display 1001) or more of the display 1002, the electronic device 101 may switch the display 1001 from the on state to the off state. According to various embodiments, the display 1001 in the off state may be switched to the on state according to the above-described gesture. In this case, the electronic device 101 may switch between on/off states of the display 1001 when the gesture stops for a predetermined time (e.g., four seconds) or longer. Although a hand is illustrated as the object 205 in FIG. 10A, a gesture using a finger or various input means (e.g., an electronic pen) may also be included.

FIG. 10C illustrates the off state 1003c of the display 1001 of the electronic device 101. What has been described in other paragraphs is briefly described or omitted.

According to various embodiments, the gesture identified by the electronic device 101 may be a gesture of shaking a finger left and right (direction A) on the display 1001.

According to various embodiments, when the electronic device 101 identifies a gesture of shaking a finger left and right (direction A), the electronic device 101 may perform the function of switching the display 1001 in the off state to the on state.

According to various embodiments, the electronic device 101 may identify the number of fingers and, when the number of fingers is a preset number (e.g., two) or more, perform the function of switching the display 1001 to the on state.

According to various embodiments, the electronic device 101 may perform a function corresponding to the number of fingers according to the identified number of fingers. For example, when the number of identified fingers is three, the electronic device 101 may execute a preset application (e.g., a camera application).

Although a finger is illustrated as the object 205 in FIG. 10C, the above-described gesture may include a gesture of shaking a hand to cover a predetermined area 1002 or more (e.g., 80% or more) of the display 1001.

As described above, in FIGS. 10A to 10C, as functions corresponding to gestures, the function of accepting or rejecting a call, switching the display to the off state, or switching the display to the on state is described. However, it will be appreciated by one of ordinary skill in the art that in addition to the above-described examples, functions corresponding to gestures (not shown) may be performed by the electronic device 101.

The operation of identifying a gesture by the electronic device 101 described in FIGS. 10A to 10C may be performed based on the attribute of the object and an image of the object obtained by a camera (e.g., the camera module 180 of FIG. 1).

Figure 11:
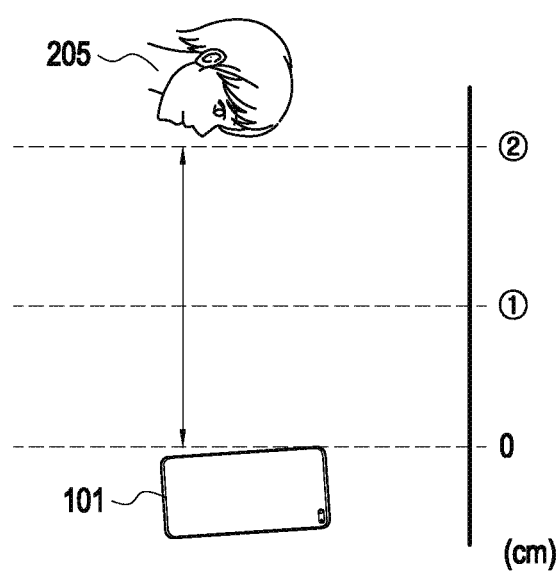
FIG. 11 is an example view illustrating an operation method of an electronic device according to various embodiments.

FIG. 11 is an example view illustrating an operation method of an electronic device 101 according to various embodiments.

According to various embodiments, the electronic device 101 may transmit a first signal (e.g., a millimeter wave) to an object 205. The electronic device 101 may receive a first reflection signal reflected by the object 205. When it is determined that the object 205 is positioned in a second range (e.g., larger than the second threshold ② and equal to or less than a third threshold), the electronic device 101 may determine the output period of the second signal as the second period (e.g., 2 ms or 5 ms). For example, the second threshold may be 20 cm, and the third threshold may be 50 cm.

According to various embodiments, the electronic device 101 may output the second signal in the second period and may identify an attribute of the object 205 based on the second reflection signal of the second signal. For example, the attributes of the object may include at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or the direction or speed the object moves).

According to various embodiments, the electronic device 101 may identify the object 205 (e.g., a human face) based on the identified attribute of the object 205. For convenience of description, a series of operations in which the electronic device 101 identifies the face may be referred to as an authentication mode of the electronic device.

According to various embodiments, the electronic device 101 may include a memory (e.g., the memory 130 of FIG. 1). The memory 130 may store reference data learned for face authentication. The electronic device 101 may transmit (or emit) at least one signal (e.g., a millimeter wave) to an object (e.g., face) using the communication circuit (e.g., the communication module 190 of FIG. 1) and receive at least one reflection signal which is the transmitted signal reflected by the object. The electronic device 101 may extract the CIR from the at least one received reflection signal and gather data, such as real value, imaginary value, phase, or amplitude, for specific tabs having valid information in the CIR. The electronic device 101 may gather data for a plurality of objects by repeating the above-described signal transmission operation to the CIR extraction operation on the plurality of objects. The above-described CIR may have different patterns according to faces. The electronic device 101 may perform training by applying the above-described data to a trained model (e.g., a rule-based model or an artificial intelligence model trained according to at least one of machine learning, a neural network, or a deep learning algorithm). The electronic device 101 may generate authentication templates (in other words, authentication reference data) from the gathered data based on the training and may store the generated authentication templates in the memory 130. The operations described in these paragraphs may be performed by an external electronic device (e.g., the electronic device 102 or 104 of FIG. 1) or a server (e.g., the server 108 of FIG. 1), as well as the electronic device 101. The generated authentication templates described in these paragraphs may be stored in a memory of an external electronic device or a memory of a server, as well as the memory 130.

According to various embodiments, the electronic device 101 may obtain, from the second reflection signal, at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or the direction or speed the object moves), as the attributes of the object.

At least one signal for obtaining data for the attribute of object and/or the reference data for face authentication, described in the above paragraphs, may be transmitted in a shorter transmission period than at least one signal for obtaining data for the attribute of object and/or reference data for gesture identification.

According to various embodiments, the electronic device 101 may compare the obtained data with the authentication templates stored in the memory 130, identifying whether the object 205 on which authentication is performed is the user's face.

Figure 12:
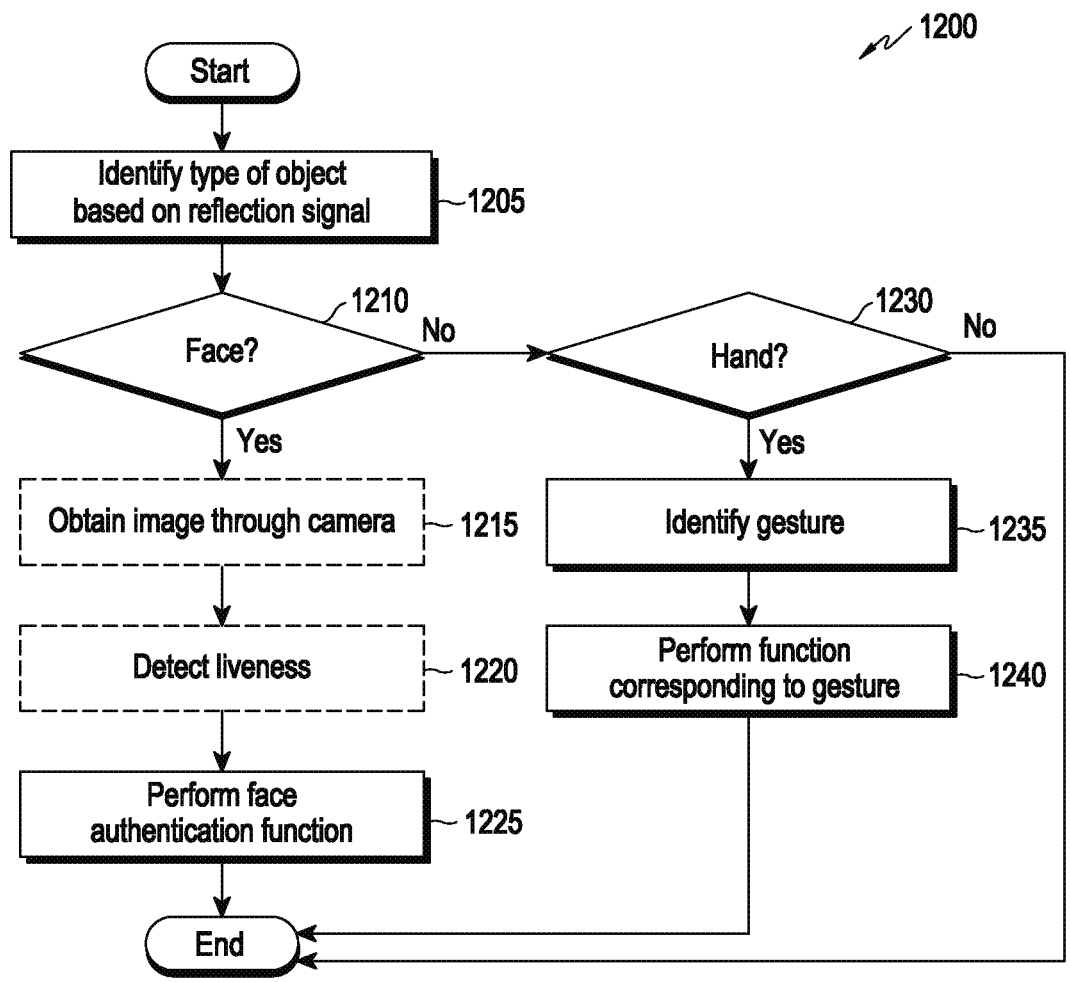
FIG. 12 is a flowchart illustrating an operation method of an electronic device according to various embodiments.

FIG. 12 is a flowchart 1200 for describing an operation method of an electronic device (e.g., the electronic device 101 of FIG. 1) according to various embodiments.

According to various embodiments, in operation 1205, the electronic device 101 may identify a type of object based on a reflection signal. The electronic device 101 may determine whether the type of object is face or hand (or finger) based on the attribute of object. For example, the electronic device 101 may determine whether the type of object is face or hand (or finger) based on the gesture template or authentication template, as described above in connection with FIG. 9 or 11. According to various embodiments, the above-described operation of determining the type of object may include the operation of determining liveness described above in connection with operation 850b of FIG. 8B. For example, the attributes of the object may include at least one of the position of the object (e.g., the distance from the electronic device 101 to the point where the object is positioned), the material of the object (e.g., skin), the angle of the object (e.g., the angle of incidence of the signal reflected by the object), the area of the object (e.g., the area where the object covers the display (e.g., the display device 160 of FIG. 1)), the shape of the object, or the movement of the object (e.g., whether the object moves, or the direction or speed the object moves).

According to various embodiments, in operation 1210, the electronic device 101 may identify whether the type of object is a human face. The electronic device 101 may identify whether the type of object is face or hand (or finger) based on the attribute of object. The electronic device 101 may identify whether the type of object is face or hand (or finger) based on the gesture template or authentication template described above in connection with FIG. 9 or 11. According to various embodiments, the above-described operation of identifying the type of object may include the operation of determining liveness described above in connection with operation 850b of FIG. 8B. When the operation of identifying the type of object further includes operation 850b of FIG. 8B, operation 1220 may be omitted.

According to various embodiments, in operation 1215, when the type of the object is identified as a human face, the electronic device 101 may obtain an image of the object (e.g., face) through a camera (e.g., the camera module 180 of FIG. 1). For example, if the type of object is estimated to be a human face, the electronic device 101 may drive the camera (e.g., the camera module 180 of FIG. 1) to confirm whether the type of object is a human face.

According to various embodiments, in operation 1220, the electronic device 101 may identify the liveness of the object. According to various embodiments, operation 1220 may be described in the same manner as the operation of detecting liveness described in operation 850b of FIG. 8B. More specifically, the electronic device 101 may perform operation 1210 and/or operation 1215 and, if the type of object is identified as a human face, detect liveness, thereby identifying whether the shape of the identified human face is an object (i.e., a non-living object) with a human face or a person (i.e., a living thing).

According to various embodiments, in operation 1225, the electronic device 101 may perform a face authentication function. The electronic device 101 may identify whether the object on which authentication is performed is the face of the user of the electronic device 101 based on at least one of an obtained object image, identified liveness, or authentication template (e.g., the authentication template of FIG. 11). If the object (e.g., face) on which authentication is performed is the face of the user of the electronic device 101, the electronic device 101 may perform the function of unlocking the display (e.g., the display device 160 of FIG. 1), the function of switching the display (e.g., the display device 160) from the off state to the on state, the function of login (e.g., login to website account), or a card payment function.

According to various embodiments, when the object is not a face, the electronic device 101 may determine whether the type of object is a human hand in operation 1230. When it is determined that the object is not a hand (i.e., when the object is neither a face nor a hand), the electronic device 101 may end the operations of FIG. 12.

According to various embodiments, in operation 1235, when the type of object is determined to be a human hand, the electronic device 101 may identify the gesture corresponding to the object. According to various embodiments, operation 1235 may be described in the same manner as those of FIGS. 10A to 10C and FIG. 11.

According to various embodiments, in operation 1240, the electronic device 101 may perform the function corresponding to a gesture. For example, the function corresponding to a gesture may include the function corresponding to the gesture as described above in connection with FIGS. 10A to 10C.

Figure 13:
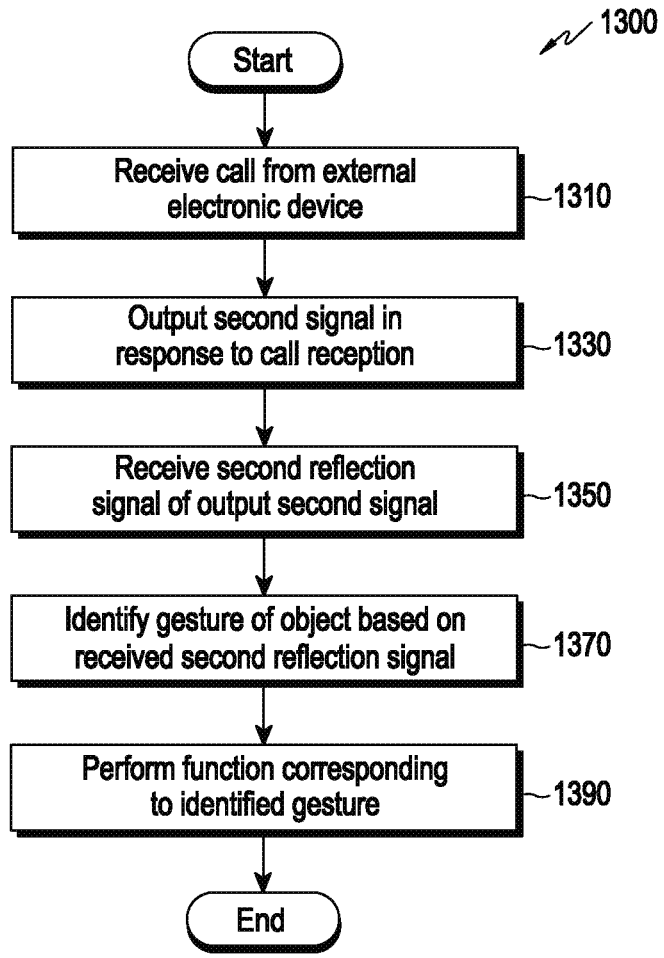
FIG. 13 is a flowchart illustrating an operation method of an electronic device according to various embodiments.

FIG. 13 is a flowchart 1300 for describing an operation method of an electronic device (e.g., the electronic device 101 of FIG. 1) according to various embodiments.

According to various embodiments, in operation 1310, the electronic device 101 may receive a call from an external electronic device (e.g., the electronic device 102 or 104 or the server 108 of FIG. 1). Upon call reception, the display (e.g., the display device 160 of FIG. 1) of the electronic device 101 may be in an off state, an always-on-display (AOD) state, a lock screen state, or a state in which a screen (e.g., 1003a of FIG. 10A) indicating that the call is being received is displayed. Upon call reception, the electronic device 101 may execute an application related to call reception.

According to various embodiments, in operation 1330, the electronic device 101 may output a second signal in response to call reception. If the call reception-related application is executed, the electronic device 101 may output the second signal in a first period (e.g., 10 ms). The second signal may be described in the same manner as the signal 203*a* described with reference to FIG. 2A. According to various embodiments, the electronic device 101 may continuously (e.g., repeatedly) output the second signal while the event according to the call reception lasts. The electronic device 101 may display a screen indicating that a call is being received through a display (e.g., the display device 160 of FIG. 1) while the event according to the call reception lasts.

According to various embodiments, the electronic device 101 may receive a second reflection signal of the output second signal in operation 1350. The electronic device 101 may receive the second reflection signal of the second signal reflected by the object (e.g., the object 205 of FIG. 2A). The second reflection signal may be described in the same manner as the reflection signal 203*b* described with reference to FIG. 2A.

According to various embodiments, in operation 1370, the electronic device 101 may identify the gesture of the object (e.g., the object 205 of FIG. 2A) based on the received second reflection signal. Operation 1370 may be described in the same manner as described above in connection with FIG. 9.

According to various embodiments, in operation 1390, the electronic device 101 may perform the function corresponding to the identified gesture. Operation 1390 may be described in the same manner as described above with reference to FIGS. 9 and 10A to 10C.

In the above-described operations 1310 to 1330, the case in which the electronic device 101 executes an application related to call reception has been described, but this is an example, and when a preset type of application is executed, operations 1330 to 1390 may be performed.

Figure 14:
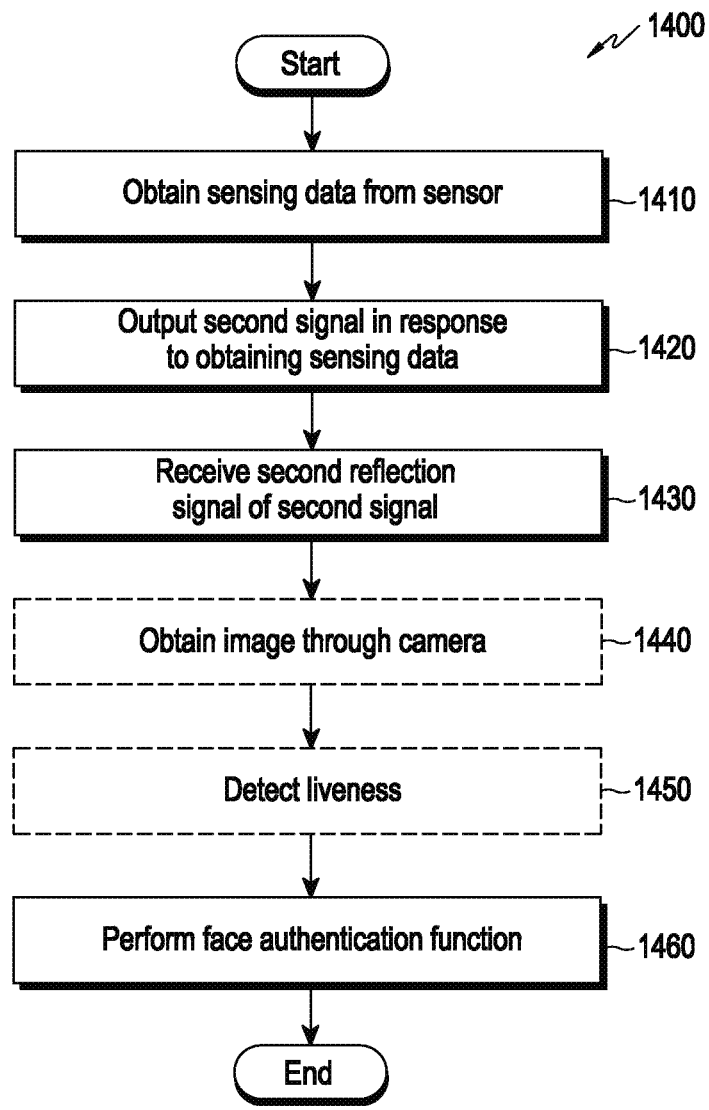
FIG. 14 is a flowchart illustrating an operation method of an electronic device according to various embodiments.

FIG. 14 is a flowchart 1400 for describing an operation method of an electronic device (e.g., the electronic device 101 of FIG. 1) according to various embodiments.

According to various embodiments, the electronic device 101 may obtain sensing data from a sensor (e.g., the sensor module 176 of FIG. 1) in operation 1410. For example, the sensor (e.g., the sensor module 176) may include, e.g., at least one of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. For example, the sensing data may include data for at least one of the direction in which the display (e.g., the display device 160 of FIG. 1) of the electronic device 101 faces or the pressure applied to the electronic device 101. As another example, when the electronic device 101 is foldable (e.g., a foldable display device or a laptop computer), the sensing data may include data for the angle between the upper/lower housings.

According to various embodiments, in operation 1420, the electronic device 101 may output a second signal in response to obtaining the sensing data. Based on the sensing data obtained from the sensor (e.g., the sensor module 176 of FIG. 1), the electronic device 101 may determine that the direction in which the display (e.g., the display device 160) of the electronic device 101 faces has been changed by a specific angle or more, determine that the pressure applied to the electronic device 101 is a specific value or more, or determine that the angle between the upper/lower housings of the electronic device 101 is a specific angle or more. For example, such cases may include when the user holds the electronic device 101 and moves over a specific angle, when the user holds the electronic device 101, and when the user lifts the upper housing of the electronic device 101 (e.g., a laptop computer). The electronic device 101 may output the second signal according to a result of the determination based on the sensing data. The second signal may be described in the same manner as the signal 203*a* described with reference to FIG. 2A.

According to various embodiments, the electronic device 101 may receive a second reflection signal of the second signal in operation 1430. The electronic device 101 may receive the second reflection signal of the second signal reflected by the object (e.g., the object 205 of FIG. 2A). It may be described in the same manner as the reflection signal 203*b* described with reference to FIG. 2A.

According to various embodiments, in operation 1440, the electronic device 101 may obtain an image through a camera (e.g., the camera module 180 of FIG. 1). The obtained image may include an object (e.g., the face of the user of the electronic device 101).

According to various embodiments, in operation 1450, the electronic device 101 may identify liveness. Operation 1450 may be described in the same manner as described with reference to FIG. 8B or FIG. 12.

According to various embodiments, in operation 1460, the electronic device 101 may perform a face authentication function. Operation 1460 may be described in the same manner as described above in connection with FIG. 11. As a result of performing the face authentication function, if the object is identified as the user of the electronic device 101, the electronic device 101 may perform the function of unlocking the display (e.g., the display device 160 of FIG. 1), the function of switching the display (e.g., the display device 160) from the off state to the on state, the function of login (e.g., login to website account), or a card payment function.

According to various embodiments, the electronic device 101 may omit at least one of operation 1440 or operation 1450.

Figure 15:
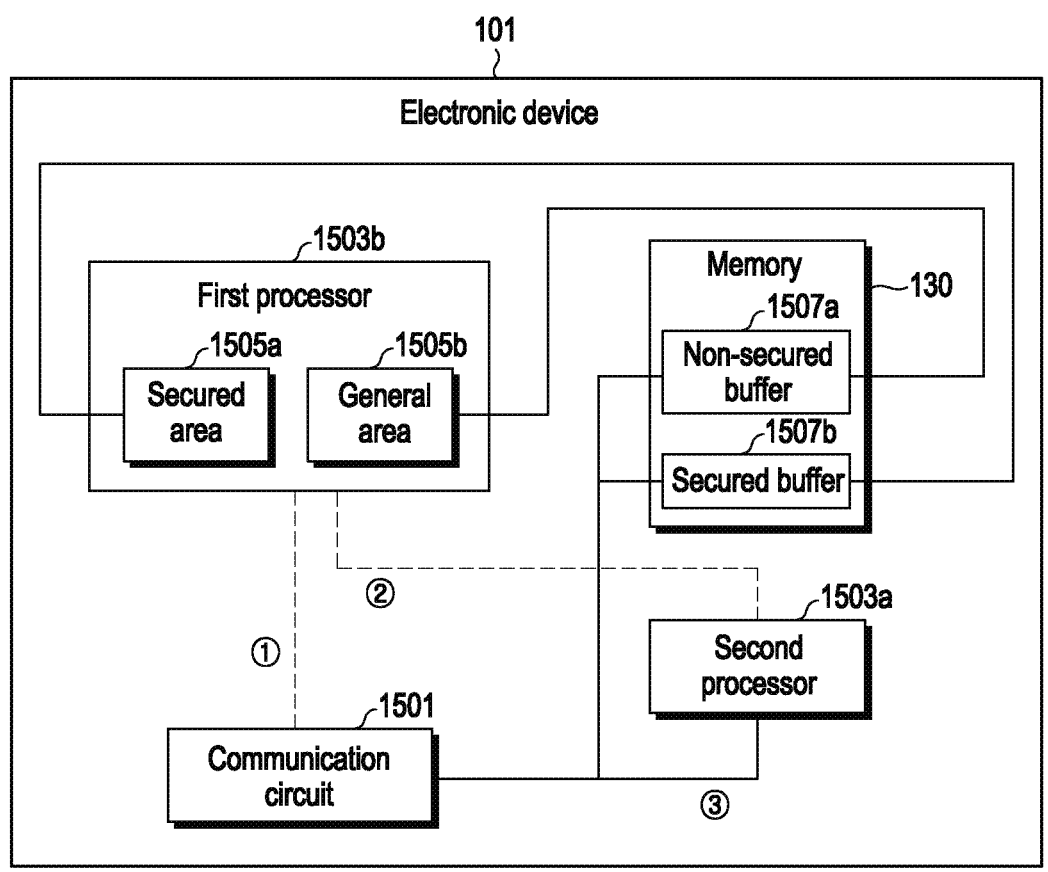
FIG. 15 is an example view illustrating an electronic device including a secured area according to various embodiments.

FIG. 15 is an example view illustrating an electronic device 101 including a secured area 1505*a* according to various embodiments.

According to various embodiments, the electronic device 101 may include at least one of a communication circuit 1501 (e.g., the communication module 190 of FIG. 1), a first processor 1503*b* (e.g., the main processor 121), a second processor 1503*a* (e.g., the auxiliary processor 123), or a memory 130.

A person skilled in the art may understand that "first processor" and "second processor" are terms used to understand the present invention and may understood them as other alternative terms having the same meaning. For example, a person skilled in the art may understand the term "first processor" as the same processor as an application processor (AP), a high-power processor, or a main processor. For example, a person skilled in the art may understand the term "second processor" as a microcontroller unit (MCU), a sub-processor, an auxiliary processor, a low-power processor, an ultra-low-power processor, a sensor hub, or a sensor hub processor.

According to various embodiments, the first processor 1503*b* and the second processor 1503*a* may perform at least some of the operations of the processor (e.g., the processor 120 of FIG. 1) described in the disclosure. The first processor 1503b and the second processor 1503a may constitute one chipset (e.g., in the form of a system on chip). The first processor 1503b and the second processor 1503a may configure different cores in a multi-core central processing unit (CPU).

According to various embodiments, the first processor 1503b may operate on the secured area 1505a in a secure mode. The first processor 1503b may operate on the general area 1505b when it is not in the secure mode. The secure mode may include an operation mode in which the first processor 1503b operates on the secured area 1505a and has an authority to access the secured buffer 1507b. The secured area 1505a may be implemented in a form physically separated from other areas (e.g., the general area 303b) (e.g., a form constituting different cores in a multi-core CPU), a form software-wise separated (e.g., a form separated in a time-division manner), or a form using both physical separation and software-wise separation. For example, the secured area 1505a may include a trust zone. The first processor 1503b may control the communication circuit 1501 directly or through the second processor 1503a when operating on the secured area 1505a. According to various embodiments, when operating on the secured area 1505a, the first processor 1503b may access data stored in the secured buffer 1507b and process data on the secured area 1505a.

According to various embodiments, the second processor 1503a may control the communication circuit 1501 to transmit a first signal (e.g., a millimeter wave) and receive a reflection signal of the signal (e.g., a millimeter wave) reflected by an object (e.g., the object 205 of FIG. 2A). The second processor 1503a may determine the distance between the electronic device 101 and the object 205 based on the reflection signal. The second processor 1503a may transmit a control signal to the first processor 1503b based on the determined distance. For example, the control signal may include a signal for switching (or operating) the first processor 1503b to the secure mode. When the first processor 1503b is in a sleep state (in other words, low-power state), the control signal may further include a wakeup signal for switching (or operating) the first processor 1503b to an active state. The sleep state (or sleep mode) may include a low-power mode in which the operation of the first processor is stopped or only some operations are performed.

According to various embodiments, the memory 130 may include at least one of a non-secured buffer 1507a or a secured buffer 1507b. The secured buffer 1507b may include a memory area access to which is restricted physically, software-wise, or physically and software-wise from the general area 1505b other than the secured area 1505a. At least part of the reference data (e.g., liveness template, gesture template, and authentication template) described in the disclosure may be stored in the secured buffer 1507b. Data received through communication between the communication circuit 1501 and an external electronic device (e.g., the electronic device 102 or 104 or the server 108 of FIG. 1) may be stored in the non-secured buffer 1507a.

According to various embodiments, the communication circuit 1501 may transmit a signal (e.g., a millimeter wave) and receive a reflection signal under the control of the first processor 1503b or the second processor 1503a. Information about the received reflection signal may be transmitted from the communication circuit 1501 to the second processor 1503a or the first processor 1503b through at least one of a path ①, a path ②, or a path ③.

According to various embodiments, the communication circuit 1501 may transmit/receive data by performing communication with the external electronic device (e.g., the electronic device 102 or 104 or server 108 of FIG. 1) under the control of the first processor 1503b.

According to various embodiments, the first processor 1503b may be operatively or electrically connected with the communication circuit 1501 through the path ①. The first processor 1503b may transmit a signal for controlling the communication circuit 1501 or receive information about a reflection signal from the communication circuit 1501 through the path ①.

According to various embodiments, the path ① may include one or two or more signal lines. More specifically, when the path ① is composed of two or more physical signal lines, the secured area 1505a and the normal area 1505b may be connected with the communication circuit 1501 through different signal lines. When the path ① is composed of one physical signal line, the secured area 1505a and the general area 1505b may be exclusively connected with the communication circuit 1501 in each phase.

According to various embodiments, the first processor 1503b may be connected with the communication circuit 1501 through the paths ② and ③ without passing through the path ①. The first processor 1503b may be exclusively connected with the communication circuit 1501 in each phase and may perform transmission/reception to the communication circuit 1501 through the paths ② and ③ exclusively from signal transmission/reception between the second processor 1503a and the communication circuit 1501 through the path ③.

Figure 16:
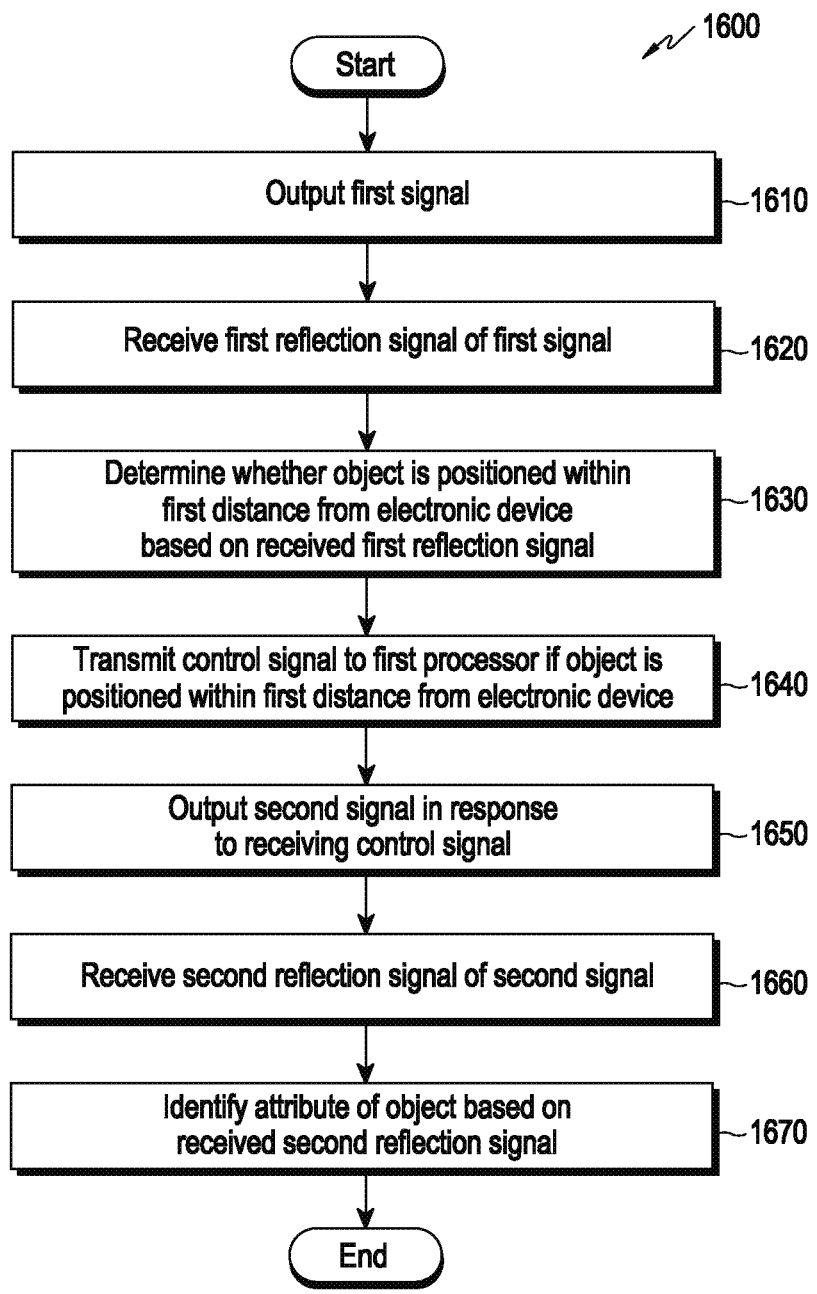
FIG. 16 is a flowchart illustrating an operation method of an electronic device according to various embodiments.

FIG. 16 is a flowchart 1600 for describing an operation method of an electronic device (e.g., the electronic device 101 of FIG. 1) according to various embodiments.

According to various embodiments, the electronic device 101 may output the first signal in operation 1610. For example, the second processor (e.g., the second processor 1503a of FIG. 15) may control the communication circuit (e.g., the communication circuit 1501 of FIG. 15) to output the first signal (e.g., a millimeter wave). The first signal may be described in the same manner as the signal 203a of FIG. 2A.

According to various embodiments, the electronic device 101 may receive a first reflection signal of the first signal in operation 1620. For example, the communication circuit 1501 may receive the first reflection signal of the first signal reflected by the object (e.g., the object 205 of FIG. 2A). The first reflection signal may be described in the same manner as the reflection signal 203b of FIG. 2A.

According to various embodiments, in operation 1630, the electronic device 101 may determine whether the object 205 is positioned within a first distance from the electronic device 101 based on the received first reflection signal. For example, the second processor 1503a may determine the distance between the electronic device 101 and the object 205 based on the first reflection signal and may determine whether the determined distance is equal to or less than the first distance. For example, the first distance may be 50 cm. Operation 1630 may be described in the same manner as operation 430 of FIG. 4.

According to various embodiments, in operation 1640, when the object 205 is positioned within a first distance from the electronic device 101, the electronic device 101 may transmit a control signal to the first processor (e.g., the first processor 1503b of FIG. 15). For example, if it is determined that the distance between the electronic device 101 and the object 205 is less than or equal to the first distance, the second processor 1503a may transmit a control signal to the first processor 1503b. For example, the control signal may include the control signal of FIG. 15.

According to various embodiments, in operation 1650, the electronic device 101 may output a second signal in response to reception of the control signal. For example, upon receiving the control signal, the first processor 1503b may switch to the secure mode (in other words, operate on a secured area (e.g., the secured area 1505a of FIG. 15)). When the first processor 1503b is in the sleep state, it may receive the control signal and switch to the active state, and switch to the secure mode. The first processor 1503b may control the communication circuit 1501 to output a second signal. The second signal may be described in the same manner as the second signal in operation 440 of FIG. 4. The first processor 1503b may obtain information about the distance between the electronic device 101 and the object 205 from the second processor 1503a to determine the output period of the second signal. The operation in which the first processor 1503b determines the output period of the second signal may be described in the same manner as operation 450 of FIG. 4.

According to certain embodiments, the electronic device 101 may receive a second reflection signal of the second signal in operation 1660. For example, the communication circuit 1501 may receive the second reflection signal of the second signal reflected by the object 205. The first processor 1503b may obtain information about the second reflection signal from the communication circuit 1501. For example, the information about the second reflection signal may include at least one of ToF and CIR of the second reflection signal.

According to various embodiments, in operation 1670, the electronic device 101 may identify an attribute of the object 205 based on the received second reflection signal. For example, the first processor 1503b may identify the attribute of the object 205 based on the obtained information about the second reflection signal. Operation 1670 may be described in the same manner as operation 470 of FIG. 4. The first processor 1503b may perform a gesture recognition function or a face authentication function based on the identified attribute of the object 205. For example, the first processor 1503b may operate on the secured area 1505a, have an authority to access the secured buffer 1507b, compare the gesture template or authentication template stored in the secured buffer 1507b with the identified attribute of the object 205, and perform the function corresponding to the gesture or a face authentication function.

Figure 17A:
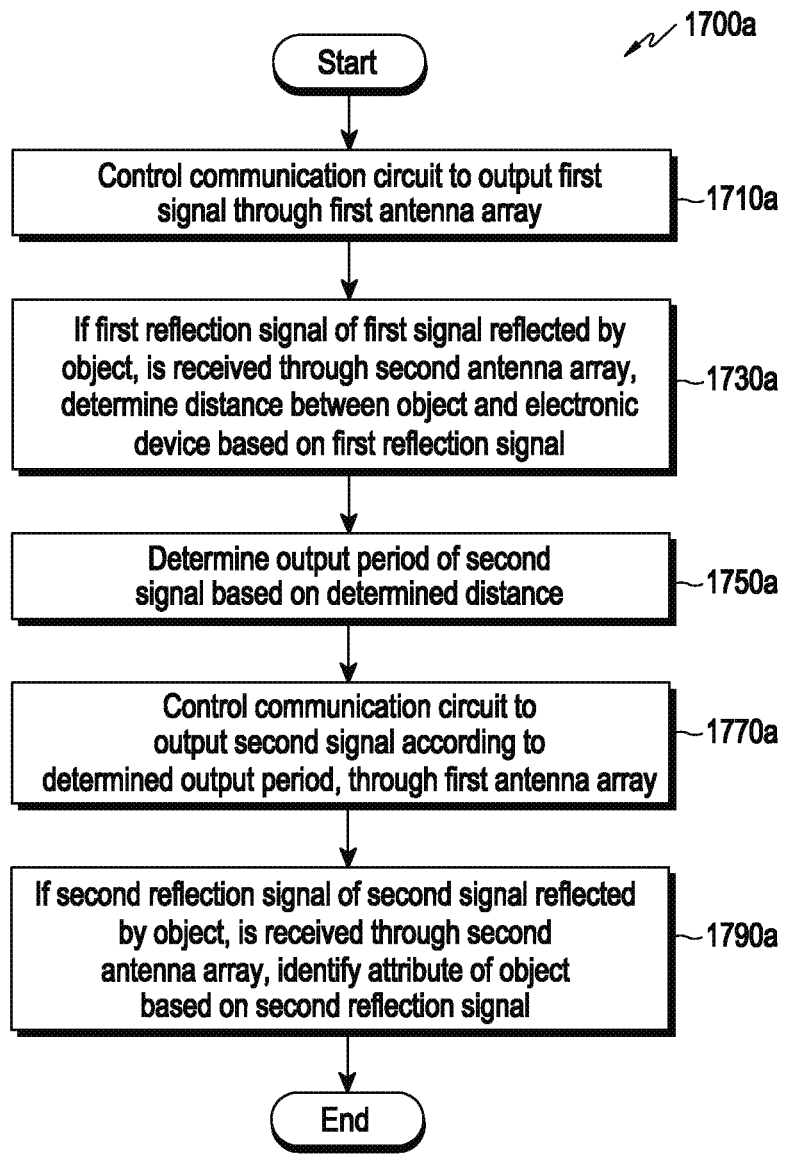
FIG. 17A is a flowchart illustrating an operation method of an electronic device according to various embodiments.

FIG. 17A is a flowchart 1700a for describing an operation method of an electronic device (e.g., the electronic device 101 of FIG. 1) according to various embodiments.

According to various embodiments, in operation 1710a, the electronic device 101 may control the communication circuit (e.g., the communication module 190 of FIG. 1) to output a first signal through a first antenna array (e.g., the first antenna 201a of FIG. 2A). For example, the processor (e.g., the processor 120 of FIG. 1) of the electronic device 101 may be configured to detect an occurrence of an event including at least one of turn-on of the display (e.g., the display device 160 of FIG. 1), execution of a predesignated application, or reception of sensing data from a sensor (e.g., the sensor module 176 of FIG. 1) and control the communication circuit to output the first signal in response to detection of the occurrence of the event.

According to various embodiments, in operation 1730a, if a first reflection signal of the first signal reflected by an object (e.g., the object 205 of FIG. 2A) is received through a second antenna array (e.g., the second antenna 201b of FIG. 2A), the electronic device 101 may determine the distance between the object 205 and the electronic device 101 based on the first reflection signal.

According to various embodiments, in operation 1750a, the electronic device 101 may determine the output period of the second signal based on the determined distance.

According to various embodiments, in operation 1770a, the electronic device 101 may control the communication circuit (e.g., the communication module 190) to output the second signal according to the determined output period, through the first antenna (e.g., the first antenna 201a).

According to certain embodiments, in operation 1790a, upon receiving a second reflection signal of the second signal reflected by the object 205 through the second antenna array (e.g., the second antenna 201b), the electronic device 101 may identify the attribute of the object 205 based on the second reflection signal.

Figure 17B:
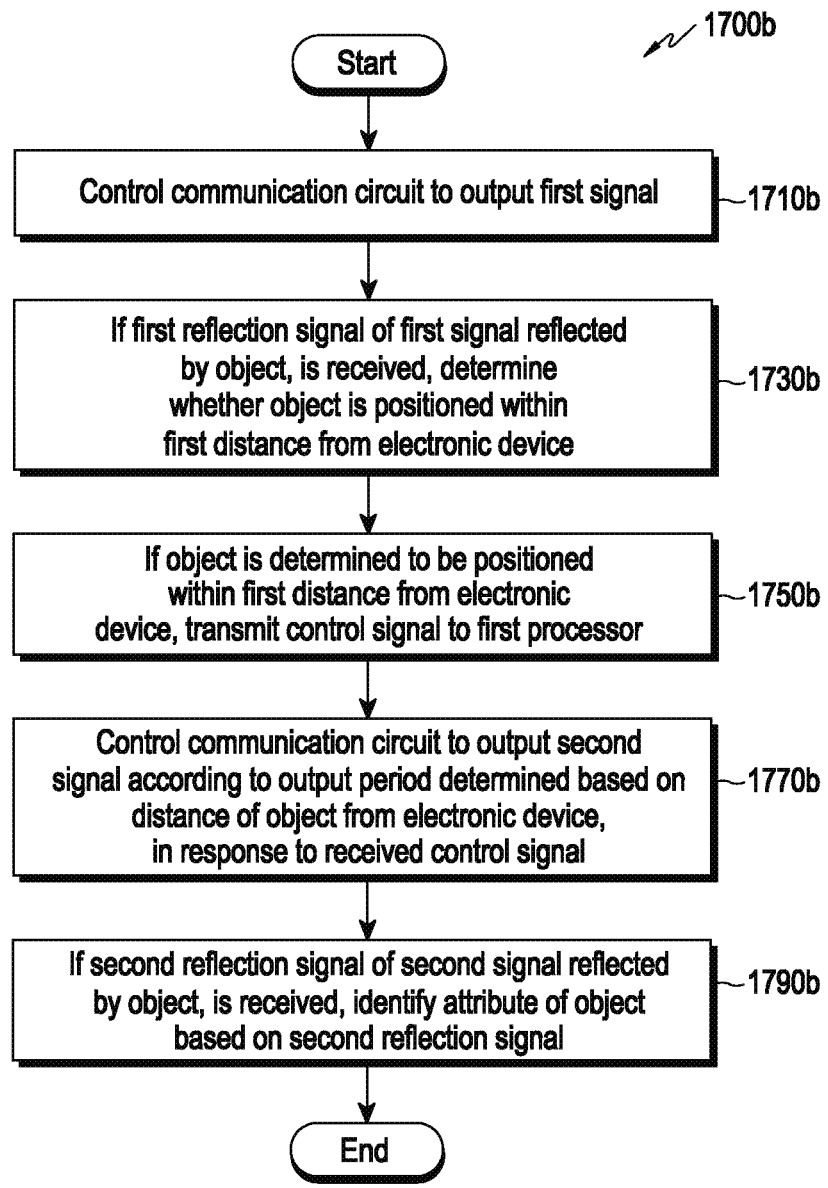
FIG. 17B is a flowchart illustrating an operation method of an electronic device according to various embodiments.

FIG. 17B is a flowchart 1700b for describing an operation method of an electronic device (e.g., the electronic device 101 of FIG. 1) according to various embodiments.

According to various embodiments, the electronic device (e.g., the second processor 1503a of FIG. 15) may control the communication circuit (e.g., the communication circuit 1501 of FIG. 15) to output a first signal in operation 1710b.

According to various embodiments, in operation 1730b, upon receiving a first reflection signal of the first signal reflected by an object (e.g., the object 205 of FIG. 2A), the electronic device (e.g., the second processor 1503a of FIG. 15) may determine whether the object 205 is positioned within a first distance from the electronic device 101 based on the first reflection signal.

According to various embodiments, in operation 1750b, it is determined that the object 205 is positioned within the first distance from the electronic device 101, the electronic device 101 (e.g., the second processor 1503a of FIG. 15) may transmit a control signal to the first processor (e.g., the first processor 1503b of FIG. 15).

According to various embodiments, in operation 1770b, in response to the received control signal, the electronic device 101 (e.g., the first processor 1503b of FIG. 15) may control the communication circuit (e.g., the communication circuit 1501 of FIG. 15) to output a second signal according to the output period determined based on the distance of the object 205 from the electronic device 101.

According to various embodiments, in operation 1790b, upon receiving a second reflection signal of the second signal reflected by the object 205, the electronic device 101 (e.g., the first processor 1503b of FIG. 15) may identify the attribute of the object 205 based on the second reflection signal.

According to various embodiments, an electronic device (e.g., the electronic device 101 of FIG. 1) using a millimeter wave may comprise a first antenna array (e.g., the first antenna 201a of FIG. 2A), a second antenna array (e.g., the second antenna 201b of FIG. 2A), a communication circuit (e.g., the communication module 190 of FIG. 1 or the communication circuit 1501 of FIG. 15), and at least one processor (e.g., the processor 120 of FIG. 1 or the second processor 1503a of FIG. 15). The at least one processor (e.g., the processor 120 of FIG. 1 or the second processor 1503a of FIG. 15) may be configured to control the communication circuit (e.g., the communication module 190 of FIG. 1 or the communication circuit 1501 of FIG. 15) to output a first signal (e.g., the signal 203a of FIG. 2A) through the first antenna array (e.g., the first antenna 201a of FIG. 2A), if a first reflection signal (e.g., the reflection signal 203b of FIG. 2A) of the first signal (e.g., the signal 203a of FIG. 2A) reflected by an object (e.g., the object 205 of FIG. 2A), is received through the second antenna array (e.g., the second antenna 201b of FIG. 2A), determine a distance (e.g., R of FIG. 2A) between the object (e.g., the object 205 of FIG. 2A) and the electronic device (e.g., the electronic device 101 of FIG. 1) based on the first reflection signal (e.g., the reflection signal 203b of FIG. 2A), determine an output period of a second signal (e.g., the signal 203a of FIG. 2A) based on the determined distance (e.g., R of FIG. 2A), control the communication circuit (e.g., the communication module 190 of FIG. 1 or the communication circuit 1501 of FIG. 15) to output the second signal (e.g., the signal 203a of FIG. 2A) according to the determined output period, through the first antenna array (e.g., the first antenna 201a of FIG. 2A), and if a second reflection signal (e.g., the reflection signal 203b of FIG. 2A) of the second signal (e.g., the signal 203a of FIG. 2A) reflected by the object (e.g., the object 205 of FIG. 2A), is received through the second antenna array (e.g., the second antenna 201b of FIG. 2A), identify an attribute of the object (e.g., the object 205 of FIG. 2A) based on the second reflection signal (e.g., the reflection signal 203b of FIG. 2A).

According to various embodiments, the at least one processor (e.g., the processor 120 of FIG. 1) may be configured to, if the distance between the object (e.g., the object 205 of FIG. 2A) and the electronic device (e.g., the electronic device 101 of FIG. 1) is determined to be a first distance (e.g., the third threshold of FIG. 11) or less, output the second signal (e.g., the signal 203a of FIG. 2A) according to the determined output period.

According to certain embodiments, the at least one processor (e.g., the processor 120 of FIG. 1) may be configured to determine whether the distance between the object (e.g., the object 205 of FIG. 2A) and the electronic device (e.g., the electronic device 101 of FIG. 1) is the first distance (e.g., the third threshold of FIG. 11) or less and a second distance (e.g., the second threshold of FIG. 8), shorter than the first distance (e.g., the third threshold of FIG. 11), or more, when the distance between the object (e.g., the object 205 of FIG. 2A) and the electronic device (e.g., the electronic device 101 of FIG. 1) is less than the second distance (e.g., the second threshold of FIG. 8), determine the output period as a first period (e.g., the first period of FIG. 8A, 8B, 9, 10A, 10B, 10C, or 13), and when the distance between the object (e.g., the object 205 of FIG. 2A) and the electronic device (e.g., the electronic device 101 of FIG. 1) is the second distance (e.g., the second threshold of FIG. 8) or more, determine the output period as a second period (e.g., the second period of FIG. 8A, 8B, 9, 10A, 10B, 10C, or 13) shorter than the first period (e.g., the first period of FIG. 8A, 8B, 9, 10A, 10B, 10C, or 13).

According to various embodiments, the at least one processor (e.g., the processor 120 of FIG. 1) may be configured to, when the distance between the object (e.g., the object 205 of FIG. 2A) and the electronic device (e.g., the electronic device 101 of FIG. 1) is less than the second distance (e.g., the second threshold of FIG. 8), identify a gesture of the object (e.g., the object 205 of FIG. 2A) based on the attribute of the object (e.g., the object 205 of FIG. 2A), and execute a function corresponding to the identified gesture.

According to various embodiments, the at least one processor (e.g., the processor 120 of FIG. 1) may be configured to, when the distance between the object (e.g., the object 205 of FIG. 2A) and the electronic device (e.g., the electronic device 101 of FIG. 1) is the second distance (e.g., the second threshold of FIG. 8) or more, perform an authentication function of the electronic device (e.g., the electronic device 101 of FIG. 1) based on the attribute of the object (e.g., the object 205 of FIG. 2A).

According to various embodiments, the electronic device (e.g., the electronic device 101 of FIG. 1) may further comprise a camera (e.g., the camera module 180 of FIG. 1). The authentication function may be performed based on an image of the object (e.g., the object 205 of FIG. 2A) obtained from the camera (e.g., the camera module 180 of FIG. 1) and the attribute of the object (e.g., the object 205 of FIG. 2A).

According to various embodiments, the attribute of the object (e.g., the object 205 of FIG. 2A) may include at least one of a position of the object (e.g., the object 205 of FIG. 2A), a material of the object (e.g., the object 205 of FIG. 2A), an angle of the object (e.g., the object 205 of FIG. 2A), an area of the object (e.g., the object 205 of FIG. 2A), a shape of the object (e.g., the object 205 of FIG. 2A), a direction of a movement of the object (e.g., the object 205 of FIG. 2A), or a speed of the movement.

According to various embodiments, the at least one processor (e.g., the processor 120 of FIG. 1) may be configured to detect an occurrence of an event on the electronic device (e.g., the electronic device 101 of FIG. 1), and control the communication circuit (e.g., the communication module 190 of FIG. 1 or the communication circuit 1501 of FIG. 15) to output the first signal (e.g., the signal 203a of FIG. 2A), in response to detecting the occurrence of the event.

According to various embodiments, the event may include at least one of turn-on of a display (e.g., the display device 160 of FIG. 1), execution of a predesignated application, or reception of sensing data from a sensor (e.g., the sensor module 176 of FIG. 1).

According to various embodiments, the at least one processor (e.g., the processor 120 of FIG. 1) may be configured to determine the output period of the second signal (e.g., the signal 203a of FIG. 2A), based on at least one of a type of a running application, a type of an occurring event, or sensing data obtained from a sensor (e.g., the sensor module 176 of FIG. 1).

According to various embodiments, the at least one processor (e.g., the processor 120 of FIG. 1) may be configured to identify an operation state of the electronic device (e.g., the electronic device 101 of FIG. 1), determine an output period of the first signal (e.g., the signal 203a of FIG. 2A) based on the identified operation state, and control the communication circuit (e.g., the communication module 190 of FIG. 1 or the communication circuit 1501 of FIG. 15) to output the first signal (e.g., the signal 203a of FIG. 2A) according to the determined output period of the first signal (e.g., the signal 203a of FIG. 2A).

According to various embodiments, the at least one processor (e.g., the processor 120 of FIG. 1) may be configured to determine at least one of duration or a number of repetitions for outputting the second signal (e.g., the signal 203a of FIG. 2A), based on the distance between the object (e.g., the object 205 of FIG. 2A) and the electronic device (e.g., the electronic device 101 of FIG. 1), and control the communication circuit (e.g., the communication module 190 of FIG. 1 or the communication circuit 1501 of FIG. 15) to output the second signal (e.g., the signal 203a of FIG. 2A) according to at least one of the output period of the second signal (e.g., the signal 203a of FIG. 2A) and the duration or the number of repetitions.

According to various embodiments, the at least one processor (e.g., the processor 120 of FIG. 1) may be configured to determine the attribute of the object (e.g., the object 205 of FIG. 2A) based on at least one a time-of-flight identified from the second reflection signal (e.g., the reflection signal 203b of FIG. 2A), a channel impulse response, an amplitude, a phase, or an angle of reception.

According to various embodiments, the time of flight may be identified based on a Golay sequence (e.g., the Golay sequence of FIG. 2B) included in the second reflection signal (e.g., the reflection signal 203b of FIG. 2A).

According to various embodiments, the at least one processor (e.g., the processor 120 of FIG. 1) may be configured to identify a type of the object (e.g., the object 205 of FIG. 2A), based on the attribute of the object (e.g., the object 205 of FIG. 2A), and according to the identified type of the object (e.g., the object 205 of FIG. 2A), perform a function corresponding to a gesture when the type of the object (e.g., the object 205 of FIG. 2A) is the gesture or perform an authentication function of the electronic device (e.g., the electronic device 101 of FIG. 1) when the type of the object (e.g., the object 205 of FIG. 2A) is a face.

According to various embodiments, a method for controlling an electronic device (e.g., the electronic device 101 of FIG. 1) using a millimeter wave may comprise outputting a first signal (e.g., the signal 203a of FIG. 2A), if a first reflection signal (e.g., the reflection signal 203b of FIG. 2A) of the first signal (e.g., the signal 203a of FIG. 2A) reflected by an object (e.g., the object 205 of FIG. 2A), is received, determining a distance (e.g., R of FIG. 2A) between the object (e.g., the object 205 of FIG. 2A) and the electronic device (e.g., the electronic device 101 of FIG. 1) based on the first reflection signal (e.g., the reflection signal 203b of FIG. 2A), determining an output period for outputting a second signal (e.g., the signal 203a of FIG. 2A) based on the determined distance (e.g., R of FIG. 2A), outputting the second signal (e.g., the signal 203a of FIG. 2A) according to the determined output period, and if a second reflection signal (e.g., the reflection signal 203b of FIG. 2A) of the second signal (e.g., the signal 203a of FIG. 2A) reflected by the object (e.g., the object 205 of FIG. 2A), is received, identifying an attribute of the object (e.g., the object 205 of FIG. 2A) based on the second reflection signal (e.g., the reflection signal 203b of FIG. 2A).

According to various embodiments, an electronic device (e.g., the electronic device 101 of FIG. 1) using a millimeter wave (e.g., the signal 203a or the reflection signal 203b of FIG. 2A) may comprise a communication circuit (e.g., the communication module 190 of FIG. 1 or the communication circuit 1501 of FIG. 15) configured to transmit or receive the millimeter wave (e.g., the signal 203a or the reflection signal 203b of FIG. 2A), a first processor (e.g., the first processor 1503b of FIG. 15), and a second processor (e.g., the second processor 1503a of FIG. 15). The second processor (e.g., the second processor 1503a of FIG. 15) may be configured to control the communication circuit (e.g., the communication module 190 of FIG. 1 or the communication circuit 1501 of FIG. 15) to output a first signal (e.g., the signal 203a of FIG. 2A), if a first reflection signal (e.g., the reflection signal 203b of FIG. 2A), which is the first signal (e.g., the signal 203a of FIG. 2A) reflected by an object (e.g., the object 205 of FIG. 2A), is received, determine whether the object (e.g., the object 205 of FIG. 2A) is positioned within a first distance (e.g., the third threshold of FIG. 11) from the electronic device (e.g., the electronic device 101 of FIG. 1) based on the first reflection signal (e.g., the reflection signal 203b of FIG. 2A), if the object (e.g., the object 205 of FIG. 2A) is determined to be positioned within the first distance (e.g., the third threshold of FIG. 11) from the electronic device (e.g., the electronic device 101 of FIG. 1), and transmit a control signal to the first processor (e.g., the first processor 1503b of FIG. 15). The first processor (e.g., the first processor 1503b of FIG. 15) may be configured to control the communication circuit (e.g., the communication module 190 of FIG. 1 or the communication circuit 1501 of FIG. 15) to output a second signal (e.g., the signal 203a of FIG. 2A) according to an output period determined based on a distance of the object (e.g., the object 205 of FIG. 2A) from the electronic device (e.g., the electronic device 101 of FIG. 1), in response to the received control signal and, if a second reflection signal (e.g., the reflection signal 203b of FIG. 2A) of the second signal (e.g., the signal 203a of FIG. 2A) reflected by the object (e.g., the object 205 of FIG. 2A), is received, identify an attribute of the object (e.g., the object 205 of FIG. 2A) based on the second reflection signal (e.g., the reflection signal 203b of FIG. 2A).

According to various embodiments, the control signal may include a signal for waking up the first processor (e.g., the first processor 1503b of FIG. 15).

According to various embodiments, the first processor (e.g., the first processor 1503b of FIG. 15) may have a secured area (e.g., the secured area of FIG. 15) separated from a general area (e.g., the general area 1505b of FIG. 15). The first processor (e.g., the first processor 1503b of FIG. 15) may be configured to process the received second reflection signal (e.g., the reflection signal 203b of FIG. 2A) in the secured area (e.g., the secured area 1505a of FIG. 15) to identify the attribute of the object (e.g., the object 205 of FIG. 2A) in response to the received control signal.

According to various embodiments, the electronic device (e.g., the electronic device 101 of FIG. 1) may further comprise a secured buffer (e.g., the secured buffer 1507b of FIG. 15) and a non-secured buffer (e.g., the non-secured buffer 1507a of FIG. 15). The secured area (e.g., the secured area 1505a of FIG. 15) may be physically or time-divisionally separated from the general area (e.g., the general area 1505b of FIG. 15). The first processor (e.g., the first processor 1503b of FIG. 15) may be configured to process reference data stored in the secured buffer (e.g., the secured buffer 1507b of FIG. 15) and the received second reflection signal in the secured area (e.g., the secured area 1505a of FIG. 15) to identify the attribute of the object (e.g., the object 205 of FIG. 2A).

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a first antenna array;
a second antenna array;
a communication circuit;
a camera;
at least one hardware processor, and
memory, wherein the memory stores instructions that, when executed by the at least one hardware processor, cause the electronic device to:
control the communication circuit to output a first signal through the first antenna array,
receive, through the second antenna array, a first reflection signal of the first signal reflected by an object,
determine a distance between the object and the electronic device based on the first reflection signal,
based on the distance, determine whether the distance is less than a first threshold distance,
based on the distance being equal to or less than the first threshold distance:
  determine whether an angle of incidence of the first reflection signal is equal to or less than a threshold angle, wherein the angle of incidence of the first reflection signal includes a maximum angle among angles of incidence detected with respect to the camera,
  when the angle of incidence of the first reflection signal is equal to or less than the threshold angle, determine an output period of a second signal as a first output period,
  set a mode of the electronic device to a gesture recognition mode configured to identify a gesture of the object, after determining the first output period of the second signal, and
  output the second signal based on the first output period of the second signal in the gesture recognition mode,
based on the distance being greater than the first threshold distance:
  determine whether the distance is less than a second threshold distance longer than the first threshold distance,
  based on the distance is equal to or less than the second threshold distance, determine whether the object corresponds to a face of a user,
  based on the object corresponding to the face of the user, determine the output period of the second signal as a second output period shorter than the first output period,
  set the mode of the electronic device to an authentication mode configured to identify the face of the user, after determining the second output period of the second signal, and
  output the second signal based on the second output period of the second signal in the authentication mode.

2. The electronic device of claim 1, wherein an authentication function in the authentication mode is performed based on an image of the object obtained from the camera and an attribute of the object.

3. The electronic device of claim 2, wherein the attribute of the object comprises at least one of a position of the object, a material of the object, an angle of the object, an area of the object, a shape of the object, a direction of a movement of the object, or a speed of the movement.

4. The electronic device of claim 1, wherein the instructions that, when executed by the at least one hardware processor, cause the electronic device to:
   detect an occurrence of an event on the electronic device, and
   control the communication circuit to output the first signal, in response to detecting the occurrence of the event.

5. The electronic device of claim 4, wherein the event comprises at least one of turn-on of a display, execution of a predesignated application, or reception of sensing data from a sensor.

6. The electronic device of claim 1, wherein the instructions that, when executed by the at least one hardware processor, cause the electronic device to determine the first output period for outputting the second signal and the second output period for outputting the second signal, based on at least one of a type of a running application, a type of an occurring event, or sensing data obtained from a sensor.

7. The electronic device of claim 1, wherein the instructions that, when executed by the at least one hardware processor, cause the electronic device to:
   identify an operation state of the electronic device,
   determine an output period of the first signal based on the identified operation state, and
   control the communication circuit to output the first signal according to the determined output period of the first signal.

8. The electronic device of claim 1, wherein the instructions that, when executed by the at least one hardware processor, cause the electronic device to:
   determine at least one of time duration or a number of repetitions for outputting the second signal, based on the distance between the object and the electronic device, and
   control the communication circuit to output the second signal according to at least one of the first output period of the second signal, the second output period of the second signal, the time duration, or the number of repetitions.

9. The electronic device of claim 1, wherein the instructions that, when executed by the at least one hardware processor, cause the electronic device to identify the attribute of the object based on at least one a time-of-flight (ToF) identified from the second reflection signal, a channel impulse response, an amplitude, a phase, or an angle of reception.

10. A non-transitory storage medium storing one or more program, the one or more program comprising computer-executable instructions, when executed by at least one processor an electronic device, cause the electronic device to:
   control a communication circuit of the electronic device to output a first signal through a first antenna array of the electronic device,
   receive, through a second antenna array of the electronic device, a first reflection signal of the first signal reflected by an object,
   determine a distance between the object and the electronic device based on the first reflection signal,
   based on the distance, determine whether the distance is less than a first threshold distance,
   based on the distance being equal to or less than the first threshold distance:
      determine whether an angle of incidence of the first reflection signal is equal to or less than a threshold angle, wherein the angle of incidence of the first reflection signal includes a maximum angle among angles of incidence detected with respect to the camera,
      when the angle of incidence of the first reflection signal is equal to or less than the threshold angle, determine an output period of a second signal as a first output period,
      set a mode of the electronic device to a gesture recognition mode configured to identify a gesture of the object, after determining the first output period of the second signal, and
      output the second signal based on the first output period of the second signal in the gesture recognition mode,
   based on the distance being greater than the first threshold distance:
      determine whether the distance is less than a second threshold distance longer than the first threshold distance,
      based on the distance is equal to or less than the second threshold distance, determine whether the object corresponds to a face of a user,
      based on the object corresponding to the face of the user, determine the output period of the second signal as a second output period shorter than the first output period,
      set the mode of the electronic device to an authentication mode configured to identify the face of the user, after determining the second output period of the second signal, and
      output the second signal based on the second output period of the second signal in the authentication mode.

* * * * *